US011950599B2

(12) United States Patent
Baker et al.

(10) Patent No.: US 11,950,599 B2
(45) Date of Patent: Apr. 9, 2024

(54) COMPOSITIONS AND METHODS FOR ENHANCED $CO_2$ CAPTURE AND STORAGE

(71) Applicant: CO2 Solved, LLC, Junction City, OR (US)

(72) Inventors: George Baker, Junction City, OR (US); Sheryl S. Webb, Creswell, OR (US); Clifford Fairchild, Corvallis, OR (US)

(73) Assignee: CO2 Solved, LLC, Junction City, OR (US)

( * ) Notice: Subject to any disclaimer, the term of this patent is extended or adjusted under 35 U.S.C. 154(b) by 172 days.

(21) Appl. No.: 17/313,957

(22) Filed: May 6, 2021

(65) Prior Publication Data

US 2021/0329922 A1    Oct. 28, 2021

Related U.S. Application Data

(62) Division of application No. 16/174,606, filed on Oct. 30, 2018, now Pat. No. 11,019,822.

(60) Provisional application No. 62/579,017, filed on Oct. 30, 2017.

(51) Int. Cl.
*A01N 59/06* (2006.01)
*A01G 7/06* (2006.01)
*A01N 25/04* (2006.01)
*A01N 25/30* (2006.01)

(52) U.S. Cl.
CPC ............. *A01N 59/06* (2013.01); *A01N 25/04* (2013.01); *A01N 25/30* (2013.01); *A01G 7/06* (2013.01)

(58) Field of Classification Search
CPC . A01G 15/00; A01G 7/06; A01G 7/00; A01G 13/00; A01G 7/045; A01G 9/249; A01N 25/04; A01N 25/30; A01N 59/00; A01N 59/06; A01N 25/26; A01N 59/16; A01N 2300/00; Y02P 60/20; Y02P 60/00
USPC ...................................................... 504/116.1
See application file for complete search history.

(56) References Cited

U.S. PATENT DOCUMENTS

| | | | |
|---|---|---|---|
| 6,069,112 A * | 5/2000 | Glenn .................... | A01N 59/06 504/120 |
| 6,110,867 A | 8/2000 | Glenn et al. | |
| 6,402,824 B1 | 6/2002 | Freeman et al. | |
| 6,464,995 B1 * | 10/2002 | Sekutowski ........... | A01N 25/26 504/362 |
| 8,188,005 B2 | 5/2012 | Choi | |
| 8,209,128 B1 | 6/2012 | Gourley | |
| 9,185,848 B2 | 11/2015 | Baker et al. | |
| 9,642,361 B2 | 5/2017 | Baroja Fernandez et al. | |
| 2003/0077309 A1 | 4/2003 | Puterka et al. | |
| 2004/0117871 A1 | 6/2004 | Meyer et al. | |
| 2004/0120902 A1 | 6/2004 | Wernett et al. | |
| 2004/0220056 A1 | 11/2004 | Glenn et al. | |
| 2009/0089898 A1 | 4/2009 | Karchi | |
| 2012/0183594 A1 | 7/2012 | Glenn et al. | |
| 2013/0116119 A1 | 5/2013 | Rees et al. | |
| 2015/0050322 A1 | 2/2015 | Ashcroft et al. | |

OTHER PUBLICATIONS

Aggarwal, C., et al., "Phosphoinositides Play Differential Roles in Regulating Phototropin1- and Phototropin2-Mediated Chloroplast Movements in *Arabidopsis*," PLOS One 8(2):1-11, Feb. 2013.
Bryant, D.A., and D.P. Canniffe, "How Nature Designs Light-Harvesting Antenna Systems: Design Principles and Functional Realization in Chlorophototrophic Prokaryotes," Journal of Physics B: Atomic, Molecular and Optical Physics 51:033001, 2018, 49 pages.
Dabrowski, Z.T., "Fruit Crops," Biostimulators in Modern Agriculture, 2008.
Dolinsky, M., and R.P. Hangarter, "The Living Canvas: Interactive Chloroplasts," Proceedings of IEEE VIS 2014 Arts Program VISAP'14: Art+Interpretation, Nov. 9-14, 2014, Paris, 5 pages.
Dordas, C., "Foliar Application of Calcium and Magnesium Improves Growth, Yield, and Essential Oil Yield of Oregano (*Origanum vulgare* ssp. *hirtum*)," Industrial Crops and Products 29(2-3):599-608, 2009.
Gal, A., et al., "Certain Biominerals in Leaves Function as Light Scatterers," Advanced Optical Materials 24(10):OP77-OP83, Mar. 2012.
Gitelson, A.A., et al., "The Chlorophyll Fluorescence Ratio F735/F700 as an Accurate Measure of Chlorophyll Content in Plants," Remote Sensing of Environment 69(3):296-302, Sep. 1999.
Kadota, A., et al., "Polarotropism and Photomovement of Chloroplasts in the Protonemata of the Ferns Pteris and Adiantum: Evidence for the Possible Lack of Dichroic Phytochrome in Pteris," Plant Cell Physiology 30(4):523-531, 1989.
Kasahara, M., et al., "Chloroplast Avoidance Movement Reduces Photodamage in Plants," Nature 420(6917):829-832, Dec. 2002.
Liu, C., et al., "The Synergistic Responses of Different Photoprotective Pathways in Dwarf Bamboo (*Fargesia rufa*) to Drought and Subsequent Rewatering," Frontiers in Plant Science 8:1-13, Apr. 2017.
Martinazzo, E.G., et al., "The Chlorophyll a Fluorescence as an Indicator of the Temperature Stress in Leaves of Prunis persica," Brazilian Society of Plant Physiology 24(4):237-246, 2012.
Psaltis, D., et al., "Optofluidics of Plants," APL Photonics 1:020901-1-020901-11, 2016.

(Continued)

*Primary Examiner* — Audrea B Coniglio
*Assistant Examiner* — Audrea Buckley
(74) *Attorney, Agent, or Firm* — Christensen O'Connor Johnson Kindness PLLC

(57) ABSTRACT

Provided are compositions and methods for reducing foliar chloroplast movement in plants and trees to enhance $CO_2$ trapping (carbon capture) from the air while naturally increasing the oxygen in the atmosphere and diluting the concentration of greenhouse gasses. Also provided are methods for measuring foliar chloroplast avoidance in response to treatments designed to reduce avoidance.

11 Claims, 13 Drawing Sheets

(56) References Cited

OTHER PUBLICATIONS

Siddiqui, M.H., et al., "Role of Nanoparticles in Plants," in "Nanotechnology and Plant Sciences," 2015, Chap. 2, pp. 19-35, Springer, Switzerland.
Skupień, K., and J. Oszmiański, "Influence of Titanium Treatment on Antioxidants Content and Antioxidant Activity of Strawberries," Acta Scientiarum Polonorum, Technologia Alimentaria 6(4):83-94, 2007.
Tan, W., et al., "Photosynthesis is Improved by Exogenous Calcium in Heat-Stressed Tobacco Plants," Journal of Plant Physiology 168(17):2063-2071, 2011.
Tytanit, Crop Biostimulant, Arysta LifeScience, Technical Bulletin, [retrieved as early as Jan. 13, 2017], 9 pages.
Vician, M., and P. Kováčik, "The Effect of Folic Application of Mg-Titanit Fertilizer on Phytomass, Chlorophyll Production and the Harvest of Winter Wheat," MendelNet, 2013, 7 pages.
Wada, M., and S.G. Kong, "Analysis of Chloroplast Movement and Relocation in *Arabidopsis*," Methods in Molecular Biology 774:87-102, Jan. 2011.
Wada, M., "Chloroplast and Nuclear Relocation Movements," Proceedings of the Japan Academy, Ser. B 92:387-411, 2016.
Wang, Y., et al., "The Application of Nano-$TiO_2$ Photo Semiconductors in Agriculture," Nanoscale Research Letters 11:529, 7 pages, 2016.
Whitted-Haag, B., et al., "Foliar Silicon and Titanium Applications Influence Growth and Quality Characteristics of Annual Bedding Plants," Open Horticulture Journal 7(1):6-15, 2014.
Conniff, R., "The Last Resort: Can We Remove Enough CO2 from the Atmosphere to Slow or Even Reverse Climate Change?", Scientific American 320(1):52-59, Jan. 2019.

Ahmad, B., et al., Efficacy of Titanium Dioxide Nanoparticles in Modulating Photosynthesis, Peltate Glandular Trichomes and Essential Oil Production and Quality im *Mentha piperita* L., Current Plant Biology 13:6-15, Apr. 2018.
Brugnoli, E., and O. Björkman, "Chloroplast Movements in Leaves: Influence on Chlorophyll Fluorescence and Measurements of Light-Induced Absorbance Changes Related to ΔpH and Zeaxanthin Formation," Photosynthesis Research 32(1):23-35, Apr. 1992.
Harada, A., and K.-I. Shimazaki, "Phototropins and Blue Light-Dependent Calcium Signaling in Higher Plants," Photochemistry and Photobiology 83(1):102-111, Jan.-Feb. 2007.
International Search Report and Written Opinion dated Mar. 18, 2019, issued in corresponding International Application No. PCT/US2018/58111, filed Oct. 30, 2018, 16 pages.
Kagawa, T., and M. Wada, "Blue Light-Induced Chloroplast Relocation in *Arabidopsis thaliana* as Analyzed by Microbeam Irradiation," Plant Cell Physiology 41(1):84-93, Jan. 2000.
Sato, Y., et al., "External $Ca^{2+}$ Is Essential for Chloroplast Movement Induced by Mechanical Stimulation But Not by Light Stimulation," Plant Physiology 127(2):497-504, Oct. 2001.
Gotoh, E., et al., "Chloroplast Accumulation Response Enhances Leaf Photosynthesis and Plant Biomass Production," Plant Physiology 178:1358-1369, Nov. 2018.
Office Action dated Aug. 18, 2020, from U.S. Appl. No. 16/174,606, filed Oct. 30, 2018, which is a Continuation-in-Part of the present application, 11 pages.
Notice of Allowance dated Mar. 10, 2021, from U.S. Appl. No. 16/174,606, filed Oct. 30, 2018, which is a Continuation-in-Part of the present application, 11 pages.

* cited by examiner

COMPOSITIONS AND METHODS FOR ENHANCED $CO_2$ CAPTURE AND STORAGE

CROSS-REFERENCES TO RELATED APPLICATIONS

This application is a division of U.S. application Ser. No. 16/174,606, filed Oct. 30, 2018, which claims the benefit of U.S. Application No. 62/579,0179, filed Oct. 30, 2017, each of which is expressly incorporated herein by reference in its entirety.

FIELD OF THE DISCLOSURE

The disclosure provides a new approach to enhancing $CO_2$ trapping (carbon capture) from the air while naturally increasing the oxygen in the atmosphere and diluting the concentration of greenhouse gasses.

BACKGROUND OF THE DISCLOSURE

Global warming due to the atmospheric $CO_2$ has received international attention. The Paris Agreement (Accord de Paris), Paris climate accord or Paris climate agreement, is an agreement within the United Nations Framework Convention on Climate Change (UNFCCC) dealing with greenhouse gas emissions mitigation, adaptation and finance in the year 2020. One of the aims of the agreement is to increase the ability to adapt to the adverse impacts of climate change and foster climate resilience and low greenhouse gas emissions development, in a manner that does not threaten food production.

Approaches to this aim have not to date fulfilled these needs. Plants themselves offer potential for chloroplast processing of excess atmospheric $CO_2$. Chloroplast movement in leaves allows plants to dynamically adapt to optimize use of the available solar energy while minimizing harm from overexposure to light. However, from the perspective of using plants commercially to reduce atmospheric $CO_2$, the chloroplast avoidance motion is not optimal for $CO_2$ capture and therefore photosynthesis.

The compositions and methods of the present disclosure provide a solution to this disadvantage, by reducing and preventing the chloroplasts' daytime avoidance of light. The disclosure also provides for determining the effectiveness of methods designed to optimize photosynthesis in plants, for example by reducing foliar avoidance movement by chloroplasts.

SUMMARY OF THE DISCLOSURE

Provided is a method for reducing light-sensitive foliar chloroplast movement in a plant leaf comprising applying to a surface of the leaf a treatment comprising titanium dioxide and calcium carbonate, wherein the treatment further comprises at least one surfactant. The titanium dioxide can have a particle size of about 10 nm—about 500 nm, and the calcium carbonate can have a particle size of about 200 nm to about 3 microns.

In the method the surfactant can be selected from the group consisting of lecithin, ether carboxylate, alkyl ethoxylate, and silicone.

In one embodiment of the method, the treatment is formulated with wet ground calcium carbonate and comprises components selected from the following ranges: Potable water, 8.85-20.85 w/w %; Esperse 366 (alcohol C12-16 poly(1-6)ethoxylate), 0.5-1 w/w %; Titanium dioxide, 0.5-5.0 w/w %; CCCWG at 74% Calcium Carbonate, 78-84 w/w %; Silicone PMX200 (polydimethylsiloxane fluid), 0.1-0.5 w/w %; Mergal K10N (benzisothiazol-3(2h)-one), 0-0.25 w/w %; Mergal 186 (4,4-dimethyloxazolidine), 0-0.25 w/w %; and Guar Gum, 0.05-0.15 w/w %.

In another embodiment of the method, the treatment is formulated with dry ground calcium carbonate and comprises components selected from the following ranges: Potable water, 25.65-74.35 w/w %; Dispersogen PCE (polycarboxylate ether), 0.5-1.0 w/w %; Soy Lecithin, 2.0-3.0 w/w %; Sodium carbonate: 0.2-0.5 w/w %; CCCDG, 58-61.5 w/w %; Alcohol 1.5-3.0 w/w % (ethanol or isopropanol); Clove Oil, 0-0.2 w/w %; Guar Gum 0.05-0.15 w/w %; and Titanium dioxide, 0.5-5 w/w %.

In some embodiments the titanium dioxide ranges in size from 10 nm to 50 nm, such as 10 nm, and used at a concentration of 50 ppm-500 ppm, such as 300 ppm. The titanium dioxide can also be used at sizes of 200-250 nm as a blend, and at a concentration of 1% to 5% by weight. These percentages are not intended to exclude additional concentrations that still accomplish the results as contemplated herein. For example a concentration of between 5% and 6%, or above, is also within the scope of the disclosure.

Further provided is a composition of matter formulated with dry ground calcium carbonate, the composition comprising Potable water, 30.08% w/w %; Dispersogen PCE, 0.95% w/w %; Soy Lecithin, 2.71 w/w %; Sodium carbonate, 0.38 w/w %, CCCDG, 58.43 w/w %; Alcohol, 2.14 w/w % (ethanol or isopropanol); Clove Oil, 0.19 w/w %; Guar Gum, 0.12 w/w %; and Titanium dioxide, 5.00 w/w %, and a composition of matter formulated with wet ground calcium carbonate, the composition comprising Potable water, 14.44 w/w %; Esperse 366, 1.00 w/w %; Titanium dioxide, 5.00 w/w %; CCCWG at 74% Calcium Carbonate, 78.96 w/w %; Silicone PMX200, 0.25 w/w %; Mergal K10N, 0.15 w/w %; Mergal 186, 0.10 w/w %; and Guar Gum, 0.10 w/w %.

Also provided is a method of enhancing chlorophyll production in a conifer and other agricultural plants, comprising applying to a surface of the conifer a treatment comprising titanium dioxide and calcium carbonate, wherein the treatment further comprises a surfactant. The titanium dioxide can have a particle size of about 10 nm to about 500 nm, and the calcium carbonate can have a particle size of about 200 nm to about 3 microns. In the method, the surfactant can be selected from the group consisting of lecithin (abbreviated lec.), ether carboxylate, alkyl ethoxylate, and silicone.

In the method of enhancing chlorophyll production in a conifer and other agricultural plants, the treatment can be selected from the group consisting of:

(a) a composition comprising components selected from the following ranges: Potable water, 8.85-20.85 w/w %; Esperse 366, 0.5-1 w/w %; Titanium dioxide, 0.5-5.0 w/w %; CCCWG at 74% Calcium Carbonate, 78-84 w/w %; Silicone PMX200, 0.1-0.5 w/w %; Mergal K1 ON, 0-0.25 w/w %; Mergal 186, 0-0.25 w/w %; and Guar Gum, 0.05-0.15 w/w %; and (b) a composition comprising components selected from the following ranges: Potable water, 25.65-74.35 w/w %; Dispersogen PCE, 0.5-1.0 w/w %; Soy Lecithin, 2.0-3.0 w/w %; Sodium carbonate 0.2-0.5 w/w %; CCCDG, 58-61.5 w/w %; Alcohol 1.5-3.0 w/w % (ethanol or isopropanol); Clove Oil, 0-0.2 w/w %; Guar Gum 0.05-0.15 w/w %; and Titanium dioxide, 0.5-5 w/w %.

Further provided is method for measuring the effect of a treatment on the rate of foliar chloroplast movement in a plant leaf, the method comprising: exposing a treated half and untreated half of the plant leaf (samples of the same leaf) to linear polarized laser light of 405 nm wavelength; measuring transmission of light by the treated and untreated samples; and comparing the light transmission by the treated and untreated samples, wherein reduced transmission in the treated samples indicates that the treatment is effective to reduce the rate of the foliar chloroplast movement.

In the method for measuring the effect of a treatment on the rate of foliar chloroplast movement in a plant leaf, the treatment can comprise application to the surface of the leaf a composition selected from the group consisting of:

(a) a composition comprising components selected from the following ranges: Potable water, 8.85-20.85 w/w %; Esperse 366, 0.5-1 w/w %; Titanium dioxide, 0.5-5.0 w/w %; CCCWG at 74% Calcium Carbonate, 78-84 w/w %; Silicone PMX200, 0.1-0.5 w/w %; Mergal K1 ON, 0-0.25 w/w %; Mergal 186, 0-0.25 w/w %; and Guar Gum, 0.05-0.15 w/w %; and (b) a composition comprising components selected from the following ranges: Potable water, 25.65-74.35 w/w %; Dispersogen PCE, 0.5-1.0 w/w %; Soy Lecithin, 2.0-3.0 w/w %; Sodium carbonate, 0.2-0.5 w/w %; CCCDG, 58-61.5 w/w %; Alcohol 1.5-3.0 w/w % (ethanol or isopropanol); Clove Oil, 0-0.2 w/w %; Guar Gum 0.05-0.15 w/w %; and Titanium dioxide, 0.5-5 w/w %.

In the method for measuring the effect of a treatment on the rate of foliar chloroplast movement in a plant leaf, the treated and untreated samples are preferably obtained from the same leaf. Thickness and chlorophyll content and/or chloroplast distribution can be inconsistent from leaf to leaf.

More consistent data can be achieved when the exact same area of a given leaf is exposed to the 405 nm laser beam twice, first as a bare leaf, followed by leaf treatment, and then a second exposure to the laser beam. Optionally, a lower power laser can be used, specifically a lower power 405 nm diode laser. With the lower power laser, beamsplitting to reduce laser power is not needed.

Further provided is a method that allows the same chlorophyll in the same leaf areas to avoid chlorophyll and chloroplast distribution in the same leaf, by exposure and measurement first as a bare leaf, followed by leaf treatment, and then a second exposure to the laser beam followed by measurement.

Also provided is method of evaluating the effectiveness of a composition as a sunscreen, the method comprising applying the composition to a plant leaf and measuring the ability of the composition to reduce light-induced chloroplast movement.

Further provided is a method of improving water use efficiency in plants and evaluating the improvement, the method comprising applying the composition to a plant leaf and measuring the ability of the treatment to decrease water use.

BRIEF DESCRIPTION OF THE DRAWINGS

FIG. 1 shows the steps of photosynthesis in schematic form.

FIG. 2.

FIG. 3. FIG. 3A shows a bare leaf without light exposure. FIG. 3B shows chloroplast response of a bare untreated leaf following exposure to 405 nm diode laser light. FIG. 3C shows chloroplast response of a leaf treated with CCCDGF-TD as defined in the Detailed Description following exposure to 405 nm diode laser light.

FIG. 4 is a temporal scan of 405 nm diode laser power transmitted through the treated half of the Oxalis leaf used for the experiment shown in FIG. 5. The leaf treatment consisted of CCCDGF-TD. Treatments are as defined in the Detailed Description.

FIG. 5 is a temporal scan of 405 nm diode laser power transmitted through a thin untreated Oxalis leaf.

FIG. 6 shows chloroplast movement reduction factor (RF) for treated Oxalis leaves using 405 nm diode laser light. The leaf treatments consisted of titanium dioxide preparations at 5% w/w in 4 gal/100 water and NSS45. Treatments are as defined in the Detailed Description.

FIG. 7 shows chloroplast movement reduction factor (RF) for treated Nasturtium leaves using 405 nm diode laser light. The leaf treatments are CCCDGFW-TD, E, F, G. Treatments are as defined in the Detailed Description.

FIG. 8 shows chloroplast migration (in microns) in two different Nasturtium leaves pre- and post-treatment using the formula CCCDGFW-TD as defined in the Detailed Description.

FIG. 9 shows chloroplast movement reduction factor in a ladder study of percent TD in CCCDGF on Oxalis leaves.

FIG. 10 shows temporal variation of transmission of a 405 nm laser beam through a single peppermint leaf. Upper scan (circles): bare leaf. Lower scan (squares): treated leaf (CRC058 ($CaCO_3$) w/3395 (200 nm $TiO_2$) (5% solution)).

FIG. 11 shows temporal variation of transmission of 405 nm laser beam through a peppermint leaf. Upper scan: bare leaf. Lower scan: leaf treated with CRC058 w/3395 (150 nm $TiO_2$) (5% solution)+150 ppm 10 nm $TiO_2$.

FIG. 12 shows temporal variation of transmission of 405 nm laser beam through a peppermint leaf. Upper scan: bare leaf. Lower scan: treated leaf (CRC058 w/RDI-S (5%)+300 ppm 5, 10, 20 nm $TiO_2$ nanoparticles).

FIG. 13 is a graph illustrating plant growth potential at varying temperatures.

DETAILED DESCRIPTION

Figure 1:
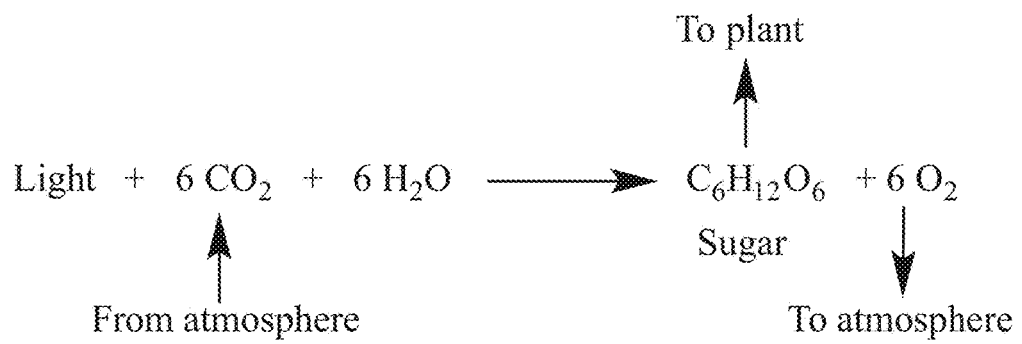
FIG. 1.

The potential for plants including trees to mitigate the increasing carbon dioxide in the Earth's atmosphere is well known and is exemplified by evidence from diverse locations in the world. One of many examples involves a single tree, and the other an entire country. The General Sherman Giant *Sequoia* is located in *Sequoia* National Park in California. At 275 feet (83 meters) tall, it is recognized as the world's tallest tree. By one calculation, this single tree has stored over a full human lifetime of carbon dioxide emission. (www.dewharvest.com/carbon-dioxide-stored-by-general-sherman-giant-sequoia.html)

At the other end of the spectrum, evidence from the Himalayan country Bhutan demonstrates that by preserving forest and agriculture, a country can achieve balance with carbon dioxide production. Bhutan is carbon negative, removing more greenhouse gasses from the atmosphere than it emits. (www.cnn.com/2018/10/11/asia/bhutan-carbon-negative/index.html)

It is not practical to solve the problem of greenhouse gas emissions by using individual trees like giant sequoias, or by returning the industrialized world to an agrarian pre-industrial existence, with wide areas of land once again covered by forest and farmland. Instead, society on a global scale needs new ways to utilize existing plant and forest growth, as well as new growth, to remove carbon dioxide from the air.

The present disclosure adds to and improves on existing approaches to carbon capture and reducing greenhouses gases in several ways. First, the disclosure provides new methods and materials for measuring and documenting chloroplast light-avoidance reduction in plants with and without treatments such as but not limited to those disclosed herein, which comprise calcium carbonate and titanium dioxide. Light-avoidance movement slows and/or stops photosynthesis (Wada, M. et al., Methods in Molecular Biology 774:87-102, 2011)

As noted above, one of the aims of the Paris Agreement is to increase the ability to adapt to the adverse impacts of climate change in a manner that does not threaten food production. This aim is also relevant to production of fiber in crops such as cotton. The methods and compositions disclosed herein can allow the production of more food and fiber even under conditions of climate change.

As used herein, plant "leaf" includes needles such as those of conifers, and "plant" is used in the broad definition to include plants occurring in the wild, landscape plants, garden plants, agricultural plants, and trees, including but not limited to horticultural trees such as fruit trees and nut crop trees. "Foliar" is used in the art-accepted definition to mean relating to leaves. The methods detect and interpret the reduced rotation of chlorophyll chromophore transition dipole moments toward alignment with the direction of polarization of laser light. The third method described herein measures the rate of strong light chloroplast avoidance movement inside plant leaf cells.

Secondly, the disclosure is directed to physical application of a composition comprising titanium dioxide and calcium carbonate in a flowable agricultural formula to plant leaf surfaces to increase chlorophyll production in a plant. "Flowable agricultural formula" is used in the art-recognized meaning to describe a suspended concentrate of ingredients. Optionally, the composition comprising dry calcium carbonate, titanium dioxide and surfactant can be made flowable at or near the site of application with the addition of water. Further details of the composition preparation are disclosed herein. The increased chlorophyll results in increased capture and sequestration of carbon molecules from the atmosphere. A further beneficial result is the increased release of oxygen occurring when the plant manufactures chlorophyll. A suitable but non-limiting application method is by spraying.

Thirdly, the methods and compositions disclosed have the capacity to be scaled up to effect large-scale increases in photosynthesis by existing plants both private and public, range lands, fields and forests, and thereby achieve a globally meaningful reduction in atmospheric $CO_2$.

In the present disclosure, when the term "carbon capture" by one or more plants (including trees and crops) is used it refers to "carbon capture, utilization and storage" by the plant.

Initial studies provided proof-of-principle results in that the foliar treatments disclosed herein gave rise to inhibition of chloroplast strong light avoidance movement. In further studies (referred to as Method No. 2), a 405 nm diode laser having a nominal output power of 10 mW was used, in place of a high power 405 nm diode laser. The 10 mW laser has an adjustable beam size, and the size was adjusted to provide a laser power density in the range of 2-4 $mW/cm^2$. These power densities were found to be adequate to provide the desired chloroplast strong light avoidance movement in the leaves of several plants of interest. Using the new laser and method, a power-reducing beamsplitter is not needed.

The procedure using the 10 mW laser is as follows:

a. A bare leaf (treated with distilled water) is mounted in the leaf-holder, and a bare-leaf laser transmission scan is carried out.

b. Keeping the position of the laser beam (now blocked) fixed and the leaf position in the holder fixed, the portion of the leaf exposed to the laser beam is treated with a desired treatment to achieve inhibition of chloroplast strong light avoidance movement.

c. A 15-30 minute wait time allows equilibration of the inhibition of chloroplast strong light avoidance movement treatment and re-accumulation of leaf chloroplasts under the chloroplast weak light accumulation condition of the weak laboratory lighting.

d. A treated-leaf scan is carried out.

Under this procedure, a normalization process is not needed for data analysis. Treated and untreated leaf areas are identical, and the two laser beams used for the transmission scans are identical; therefore, there is no need for data normalization.

Figure 4:
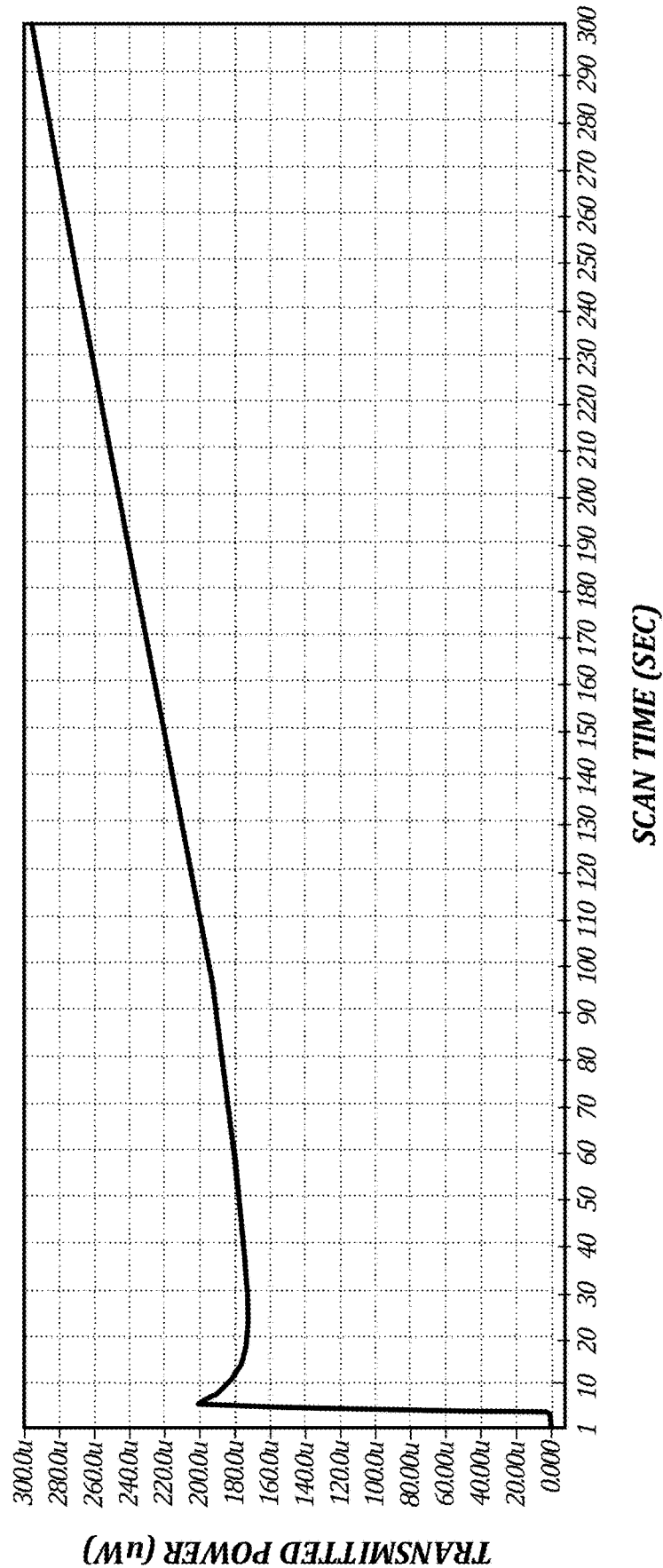
FIG. 4.
Figure 5:
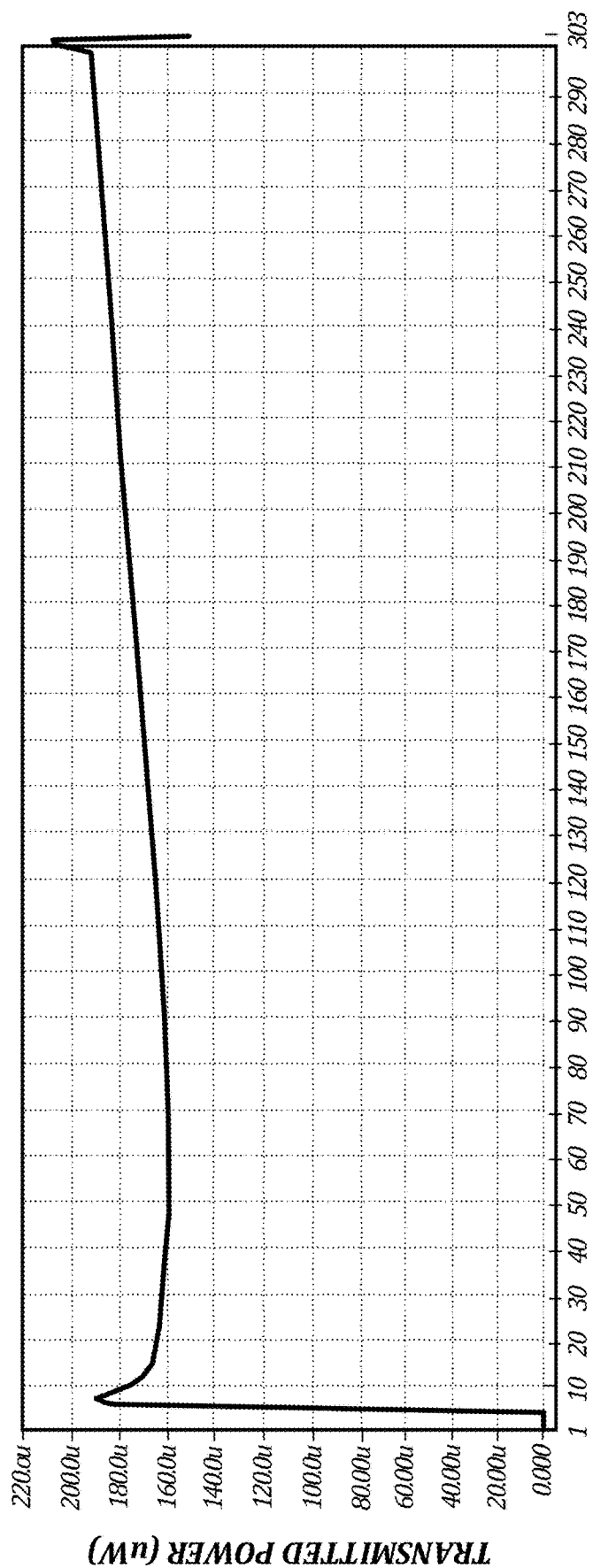
FIG. 5.

The straight-line portions of the temporal scans of a leaf's laser transmission displayed in FIGS. 4 and 5 measure the rate of chloroplast strong light avoidance movement for the bare half and the treated half, respectively, of an Oxalis leaf. In previous work involving measurements of bare-leaf chloroplast strong light avoidance movement (Aggarwal, C. et al., PLOS ONE 8:1-11, 2013; Wada, M. et al., Methods in Molecular Biology 774:87-102, 2011), a straight-line increase in leaf transmission, due to chloroplast strong light avoidance movement, was found to be maintained for roughly 10 minutes. After 10 minutes, the rate of increase of leaf transmission decreased with time, and, within a few minutes, has decreased to zero. When leaf transmission has become constant with time, chloroplast strong light avoidance movement has stopped entirely. As indicated in the data in FIGS. 4 and 5, chloroplast strong light avoidance movement stoppage occurs for a smaller value of leaf transmission for a treated leaf than is the case for a bare leaf.

For leaves from nasturtium, *impatiens*, and peppermint plants, transmission scans for treated leaves do not have straight-line increasing transmission segment. Thus, a treated leaf slope, for comparison with the slope of the straight-line segment of the bare leaf transmission scan, cannot be measured. Consequently, the methods of the disclosure involve evaluating the chloroplast strong light avoidance movement for the two laser transmission scans, for a given leaf, by measuring the difference in transmission value between the largest value of transmission, representing stoppage of chloroplast strong light avoidance movement, and the minimum in transmission value occurring after a few tens of seconds of laser transmission (shown in FIGS. 4 and 5). Using this method of data analysis in peppermint plants, values of inhibition of chloroplast strong light avoidance movement are shown in the following Table 1 and discussed further in Example 5.

TABLE 1

| Leaf Treatment | Average Chloroplast Movement Inhibition Factor | Number of Temporal Scans |
|---|---|---|
| CRC058 w/RDI-S (5%) + 300 ppm 5, 10, 20 nm TiO$_2$ | 9 | 1 |
| CRC058 w/3395 (5%) w/150 ppm 10 nm TiO$_2$ | 2.5 | 1 |
| 11Hx w/lec. (3% sol'n) w/5% RDI-S | 1.6 | 4 |
| CRC058 w/3395 (5%) | 1.4 | 2 |
| CRC90 w/RDI-S (5%) + 150 ppm 20 nm TiO$_2$ | 1.1 | 2 |
| CRC058 w/RDI-S (5%) w/150 ppm CCR200 (20 nm TiO$_2$) | 1.0 | 3 |
| CRC90 w/RDI-S + PCE | 0.5 | 2 |
| RDI-S + 20 nm TiO$_2$ (5%) | 0.5 | 2 |
| "J" CaCO$^3$ 11HX | 0.5 | 1 |
| "g" RDI-S + PCE + 150 ppm 20 nm TiO$_2$ | 0.3 | 2 |
| 11Hx w/lec. (2% sol'n) | 0.3 | 1 |
| CRC058 + lec. (2%) | 0 | 3 |

These and other aspects of the disclosure are discussed in detail below and in the Examples.

1. Methods and Equipment for Measuring and Documenting Reduction of Chloroplast Light-Avoidance in Plants.

It is known in the art that the arrangement of foliar chloroplasts changes when the intensity of foliar illumination is changed. Under weak illumination, foliar chloroplasts move to an arrangement which achieves maximum exposure of chlorophyll chromophores to the incident light. In contrast, high intensity of incident light gives rise to avoidance movement by foliar chloroplasts. These movements can include both translation (movement relative to the plane of the leaf) and rotation (three dimensional position changes).

Figure 2A:
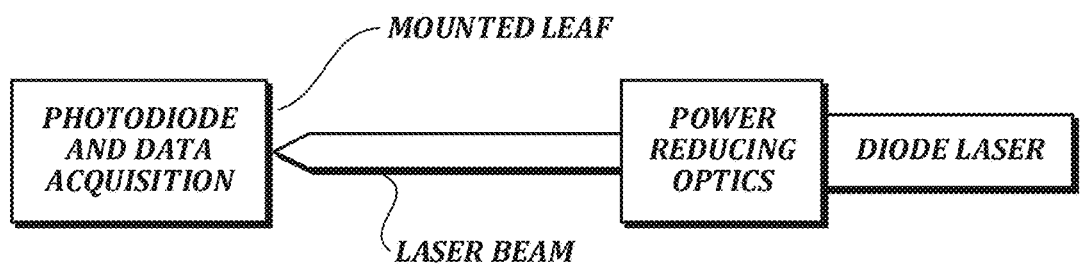
FIG. 2A shows a schematic diagram of apparatus for measuring the variation in light transmission of a mounted leaf as a function of time.
Figure 2B:
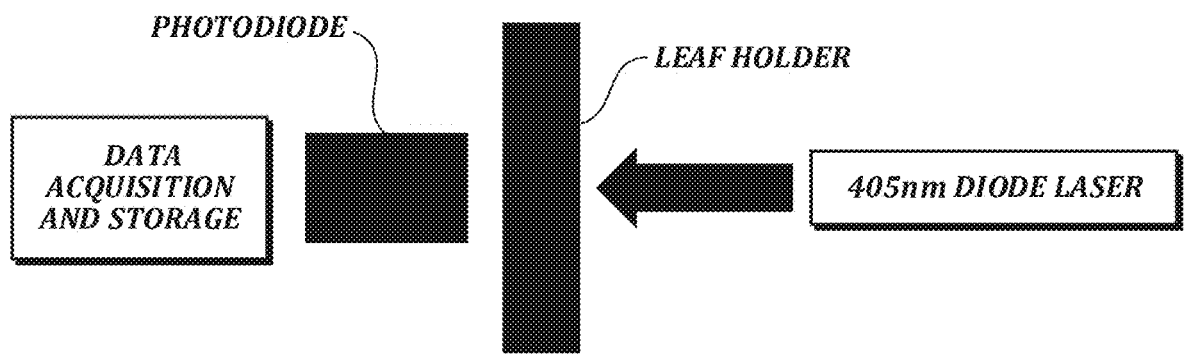
FIG. 2B shows a schematic diagram of apparatus for a second method of measuring the variation in light transmission of a mounted leaf, wherein measurements are taken from the same leaf that is untreated, then treated with a composition of the disclosure.

The foliar chloroplast avoidance movement is triggered and controlled by high intensity blue or ultraviolet light. For the procedures described herein, an intense beam of linearly polarized light of 405 nm wavelength from a high-power diode laser or a low power laser is used to illuminate plant leaves of interest. The high powered diode laser output power is over ten times the noon sun at the equator, at the 405 nm wavelength. Beamsplitting is used to obtain 405 nm light intensities equal to or slightly greater than that of equatorial noonday sunlight at 405 nm. Two different 405 nm diode lasers are used as shown in FIGS. 2A and 2B. One is high powered and the second is low powered 405 nm diode laser. The color of 405 nm light is violet, and this wavelength is very close to near ultraviolet. A second apparatus uses a low power 10 mW 405 diode laser having an adjustable beam size, and no power-reducing beamsplitter.

The procedures described herein are carried out in a photographic darkroom, where the only light is that of the diode laser and the screen backlight of the computer or other device used for data acquisition and storage. For 75 to 150 micron plant leaves, the fraction of the diode laser light transmitted by the plant leaf is readily measured using a photodiode having a diameter roughly equal to that of the laser beam. The measured light transmission fraction is of the order of 1%.

The principal feature of the procedures described herein is the measurement of the variation of light transmission by a leaf with time. The plants used in the experiments are kept in the dark or in weak light, then a leaf is removed from the plant and mounted on a dampened leaf holder so that the plane of the leaf is perpendicular to the 405 nm linearly polarized light beam from the diode laser. Two suitable experimental setups are illustrated schematically in FIG. 2.

The untreated, or bare, ½-leaf, under the spotlight of the 405 nm diode laser, provides zero inhibition of chloroplast movement, that is, the chloroplasts move out of the spotlight as fast as nature permits. The treated ½ leaf is compared with its bare (untreated) partner. The number zero (zero inhibition of movement) is assigned to all bare ½ leaves. The measure of chloroplast movement inhibition used herein is the comparison of the slope of the straight line portion of the transmission scan of a treated ½-leaf with the corresponding slope of its untreated partner. If both leaf halves are bare, the slope ratio is unity, i.e., the two slopes are the same. To obtain the number 0 for the chloroplast movement inhibition of this experiment, the slope ratio of 1 is taken, and the number 1 is subtracted.

For all treated ½-leaves, the slope of the straight line portion of the transmission scan should be smaller than the corresponding slope for its partner bare ½-leaf, because the leaf treatment inhibits chloroplast movement. To be consistent across experiments, the data analysis should also be kept consistent. The chloroplast movement inhibition number is bare ½-leaf slope divided by treated ½-leaf slope minus 1. If the leaf treatments were perfect, the slope of the straight line for the treated ½-leaf would be zero, the slope ratio would be infinite and the slope ratio minus 1 would be infinite.

With no leaf in the leaf mount, and the laser beam oriented as shown in FIG. 2A, the beam passes through the two one-centimeter diameter circular openings in the leaf mount and falls perpendicularly on the active area of the photodiode, which is slightly larger in diameter than is the laser beam. Measured laser beam intensities are slightly larger than 10 mW/cm$^2$.

For Method No. 1, before exposure of a mounted leaf to the laser beam, the power-reducing optical setup is used to rotate the laser beam away from the leaf mount front opening. Thus, the leaf has been exposed only to weak light. A temporal scan of the laser light transmitted by the leaf proceeds as follows:

1. The darkroom lights are turned off.
2. Data acquisition and storage is initiated using suitable software, such as Thorlabs software (Thorlabs, Inc., Newton, N.J., USA). LabVIEW2011 code is part of Thorlabs PM100USB detector interface unit used herein.
3. The laser beam is rotated to pass through the front opening of the leaf mount, exposing a 1 cm diameter piece of the leaf to the 10 mW/cm$^2$ laser beam.
4. Acquisition and storage of leaf transmission data is continued for a desired time interval, usually ranging between 2 and 30 minutes.

Using Method No. 1, a typical temporal scan of the transmission (T) of 405 nm diode laser light by an arbitrarily selected Oxalis leaf is shown in FIG. 5. If the only action of and within foliar chloroplasts was light avoidance, the intensity of foliar light transmission should increase monotonically with time. (Wada, M. et al., Methods in Molecular Biology 774:87-102, 2011). As the foliar chloroplast light avoidance process proceeds, the number of chlorophyll chromophores exposed to light decreases, thereby decreasing leaf absorption and increasing leaf transmission.

The initial decrease in foliar transmission seen in FIG. 5 is due to rotation of chlorophyll chromophore transition dipole moments (TDMs) toward alignment with the direction of polarization (P) of the laser light (Kadota, A., et al., Plant Cell Physiol., 30:523-531, 1989; Bryant, D. A. et al., J. Phys. B—Atomic, Molecular and Optical Physics 51:49, 2018). An increase in alignment of TDMs with P would yield an increase in light absorption by chlorophyll chromophores, and a corresponding decrease in transmission. Thus, the interpretation of the data of FIG. 5 is the occurrence of the two competing processes of TDM alignment and strong light and foliar chloroplast avoidance movement. This is verified with two independent observations, but the alignment of TDMs remains a conjecture with P remaining constant.

During the latter part of the leaf transmission scan displayed in FIG. 5, the transmission, T, increases linearly with increasing time. It is reasonable to assume that, at these later times, the rate of change of TDM alignment can be neglected, and, instead, the observed linear rate of change of transmission is due exclusively to the foliar chloroplast light avoidance movement. This measured rate of change of transmission thus provides a numerical value for the rate of foliar chloroplast light avoidance motion.

The light source initially in use for measurements of inhibition of foliar chloroplast movement was a high pressure mercury (Hg) arc lamp (available from general light source suppliers). The Hg arc lamp has its most intense light emission within sharp peaks (referred to as emission lines) located at wavelengths, in nanometers, of 365, 405, 436, 490, 546, and 579. Light emission at the lowest four of these wavelengths initiates foliar chloroplast movement; therefore, qualitatively, use of the Hg arc lamp and the 405 nm diode laser for measurements of inhibition of foliar chloroplast movement both yield the same results.

The four distinct advantages of the two diode lasers are that their light intensity (in use) is roughly twice that of the Hg arc lamp; the light beam is perfectly collimated (which is not achievable for the Hg arc lamp); and the light emission has perfect linear polarization, whereas the Hg arc lamp emits unpolarized light, and the electromagnetic (EM) fields of the lasers are perfectly coherent whereas the Hg lamp has a very low value of EM field coherent. Use of the diode laser as a light source provides a significant reduction in time needed for data acquisition and a simpler procedure for data analysis.

Two different 405 nm diode lasers, having differing power outputs, are used herein. Light from the 405 nm diode laser is coherent, whereas light from the Hg arc, low coherent, as with sunlight, is totally incoherent.

As a sample of the performance of the methods described herein, a transmission scan for a treated Oxalis leaf was performed. As indicated above for Method No. 1, reliable reproducible data comparing a temporal scan of transmission for a treated leaf with that for an untreated leaf is obtained preferably when the same leaf is used for both scans. Different leaves are of different thicknesses, they have different growth histories, and other naturally occurring variables. Thus, for the comparison of temporal scans, one half of a leaf is treated and the other half of the same leaf is left untreated.

A number of abbreviations are used in the Figures and Tables to describe the treatments. These abbreviations are as follows:
BLC: Bare Leaf Control
CCCDGF: 4% Calcium Carbonate Calcite Dry Ground Formulation
CCCWGF: 4% Calcium Carbonate Calcite Wet Ground Formulation CCCDGFW-TA, TB, TC, etc. as defined below.
4% Calcium Carbonate Dry Ground Formulation with Titanium Dioxide Candidate
CCCWGFW-TA, TB, TC, etc: 4% Calcium Carbonate Calcite Wet Ground Formulation with Titanium Dioxide Candidate as defined below.
NSS45: Neutrogena® (Johnson & Johnson, New Brunswick, N.J. USA)., Sunscreen SPF tested, undiluted.
CRC058 and CRC90 are calcium carbonate products obtained from Columbia River Carbonates (Woodland, Wash., USA).
4% solutions refer to solutions having 96% water; 2% solutions refer to solutions having 98% water.
5% w/w Titanium Dioxide Samples and Sources:
A: Huntsman Altiris 550 (Huntsman LLC, The Woodlands, Tex. 77380)
B: Cinkarna CCR 220Mn (Celje, Slovenija)
C: Huntsman Hombitec 400WP (Huntsman LLC, The Woodlands, Tex. 77380)
D: Sachtleben RDI-S(Rockwood Holdings, Inc., Pori, Finland)
E: R2145 (Specialty Minerals, Lucerne Valley, Calif., USA)
F: R3395 (Specialty Minerals, Lucerne Valley, Calif., USA)
G: PR900 (Specialty Minerals, Lucerne Valley, Calif., USA)
H: ½ RDI-S & ½ 220Mn (Rockwood Holdings, Inc., Pori, Finland)
I. Cinkarna CCR 110 (Celje, Slovenija)
J. Cinkarna CCR 200 N (Celje, Slovenija)
K. R2295 (Specialty Minerals (Lucerne Valley, Calif., USA)

The titanium dioxide used has $Al_2O_3$ surface treatment and may be doped or undoped with manganese or nitrogen. The preferred $TiO_2$ has a size range of 10 nm to 500 nm.

In FIGS. 4 and 5, the slope of the straight line portion of FIG. 5 is larger than the slope for the corresponding portion of FIG. 4. Chloroplast motion is greater for FIG. 5 than it is for FIG. 4. The inhibition of chloroplast motion can be evaluated by such comparison. FIG. 4 has more inhibition of chloroplast motion than does FIG. 5 because the ½ leaf for FIG. 4 is treated whereas the ½ leaf for FIG. 5 has no treatment, i.e., it is a bare ½ leaf.

The treated-leaf temporal scan of transmission (T) to be compared with the untreated-leaf scan displayed in FIG. 5 is shown in FIG. 4. The leaf was treated with CCCWGW-TD. In FIG. 4, the value of T at the early peak, near zero time, is lower than it is for the corresponding peak in FIG. 5. The added scattering/diffraction of light provided by the foliar treatment gives rise to a reduction of the value of T for all values of scan time. However, the alignment of the laser beam with the circular aperture in the leaf mount is not perfect; thus, a small misalignment is to be assumed.

In order to make the comparison of line slopes for the two different temporal scans of T, any differences in the intensity of light incident upon the foliar chloroplasts must be taken into account. This is done by normalizing the measured rate of change for the linear portion of a given temporal scan of T to the value of T at its peak near the zero of time. A normalization procedure is not required for the second method, because using the second method, neither the leaf position nor the position of the laser ever move. Leaf position and laser beam position when the leaf is treated are exactly the same as it is when the leaf is bare.

Even without the normalization procedure, it is seen that the rate of foliar chloroplast light avoidance movement is smaller in FIG. 4 than it is in FIG. 5. This result shows that the foliar treatment for the data of FIG. 4 inhibits the foliar chloroplast light avoidance movement. If the scans of FIGS. 4 and 5 were repeated for a different leaf, from the same plant, having the same leaf treatment applied to the treated one half of the new leaf, both straight-line slopes may differ from those of FIGS. 4 and 5. However, the normalized slope ratios for the two sets of data are expected to provide nearly equal numbers. A final number is obtained by averaging normalized slope ratios obtained from two or more sets of scans.

The leaf transmission data described herein is used to determine and compare the effectiveness of different leaf treatments in their inhibition of foliar chloroplast movement. FIGS. 4 and 5 illustrate data analysis. The normalized slope of the straight line portion of the data of FIG. 5 is 0.79/(300 sec), and that for FIG. 4 is 0.24/(300 sec). Division of these two numbers yields a bare-leaf/treated-leaf slope ratio of 3.29. If the leaf treatment yielded a total prevention of foliar chloroplast movement, the slope of the straight line portion of FIG. 4 would be zero. In this "perfect prevention" case, the bare-leaf/treated-leaf ratio would be infinite.

To complete the data analysis, it is desirable to use the number zero for the bare-leaf/bare-leaf foliar chloroplast movement prevention ratio. Therefore, the final number in use to represent the ability of a given leaf treatment to prevent foliar chloroplast movement is the bare-leaf/treated-leaf straight line slope ratio minus one. Consequently, the final number for foliar chloroplast movement prevention represented by the data of FIGS. 4 and 5 is 3.29−1=2.29.

2. Treatments to Reduce and Prevent Foliar Chloroplast Movement in Response to Bright Light.

The treatments disclosed herein consist of mixtures of $CaCO_2$ and $TiO_2$ nanoparticles, together with surfactants, in a water-based flowable agricultural formulation solution which is applied, for example sprayed, for ideally monolayer coverage of plant leaves. The disclosed foliar treatments have at least two important effects: they increase foliar scattering, or diffraction, of light; and they inhibit the light avoidance movement by foliar chloroplasts. This light-avoidance movement is known in the art (Psaltis, D., et al., Apl Photonics 1:020901-1-020901-11, 2016; Wada, M., Proc. Jpn Acad., B 92:387-411, 2016).

Taken together, these two effects increase the efficiency of photosynthesis within plant leaves, and thereby enhance $CO_2$ sequestration. The increase in diffraction/scattering of light increases the participation in photosynthesis by foliar chlorophyll chromophores (Gal, A., et al., Adv. Mater. 24:OP77-OP83, 2012); and the absorption of blue and near UV light by the $TiO_2$ nanoparticles reduces the light avoidance movement by chloroplasts.

Further results are illustrated in FIGS. 6 and 7, using Oxalis and Nasturtium leaves, respectively, and exposure to 405 nm diode laser light. In FIG. 6, the chloroplast movement reduction factor was below 0.5 for the following treatments: 4% Solution of TD, TE, TG, and TH. However, for CCCDGFW-TD (calcium carbonate and RDI-S rutile titanium dioxide), the relative reduction factor was significantly increased to 2.25. The results shown in this Figure demonstrate the improvement using calcium carbonate plus titanium dioxide in formulation, over either one alone.

FIG. 7 shows comparable results for chloroplast movement reduction factor in Oxalis leaves. The treatments are various titanium dioxide in CCCDGF.

FIG. 8 illustrates chloroplast dimensions after treatment of Nasturtium leaves as shown below in Table 2. The treated and untreated leaf samples were compared to show chloroplast photorelocation in measuring the width and length, confirming that the chloroplasts move directly toward the cell wall, extending length and decreasing in width as shown in the SEM photos such as in FIG. 3.

TABLE 2

| Treatment | Width (nm) | Length (nm) |
|---|---|---|
| Bare leaf control | 2.2 | 5.1 |
| CCCDGFW-TD | 3.5 | 4.6 |
| Bare leaf control | 1.6 | 4 |
| CCCDRFW-TD | 2.2 | 4.1 |

The new foliar treatments described herein are evaluated for an effect on foliar temperature. Leaf temperatures can be measured using a variety of methods, including an IR Temperature Gun, a FLIR IR camera attachment for cell phones, and thermocouples inserted into leaf stems. The first two methods provide instantaneous readings over broad areas, and the third method is preferred for longer term (hours, days, weeks) continuous recording of leaf temperature differences between treated and untreated leaves.

IR temperature guns are available from several commercial sources, including but not limited to Cole-Parmer (Vernon Hills, Ill. 60061, USA); and Global Industrial (Port Washington, N.Y. 11050, USA).

For the second method, a simple and inexpensive addition to cell phone cameras consists of an IR imaging attachment such as the FLIR ONE, available for example from FLIR Systems, Wilsonville, Oreg., USA.

A third method utilizes thermocouple wires inserted directly into the stems of leaves. Data recorders can be placed in waterproof containers such plastic bags to be secured onto the plant and left for days or weeks at a time recording differences in the treated and untreated samples. In one use of this method, data recorders are used with a thermocouple wire which is on a mini plug that attaches to the recorder, which takes a sample on a regular schedule, for example every five minutes. Results obtained using such a method are described in Example 6 herein.

A method of measuring leaf temperature can be chosen based on the specific experiment or study, for example one of the first two methods would be suitable for a one-time or short-term measurement in the laboratory or experimental greenhouse, and the third method would be suitable for longer-term measurements, such as in a commercial greenhouse, field, or forest where measurements do not require constant monitoring.

The energy of absorbed sunlight is distributed among photosynthesis, fluorescence, and heat dissipation. On a hot sunny day, fluorescence can reasonably be neglected (Martinazzo, G. M., et al., Braz. J. Plant Physiol., 24:237-246, 2012). Thus, the decrease in heat dissipation which must accompany an increase in photosynthesis (energy conservation) provides a lowering of foliar temperature. At high ambient temperatures, the decrease in evaporative water loss provided by the lowering of foliar temperatures improves plant health and increases $CO_2$ sequestration.

The disclosed methods and compositions enhance the biological effect of photosynthesis. Benefits include enhanced plant growth, increased carbon capture and sequestration, corresponding increased release of oxygen, and reflection of solar radiation of wave lengths less than 700 nm. The disclosed methods are designed to be more economical than existing carbon capture methods because they do not require advanced technology for ambient air $CO_2$ Capture, Geo-Storage, specialized regulations, special infrastructure or transportation needs typically associated with more traditional carbon sequestration and capture methods. Another benefit is improved water use efficiency by treated plants, described in Example 6.

A further advantage of the compositions and methods disclosed herein relates to a multiplier effect of the treatment. Example 4 provides data showing that five tree species treated with a composition of the disclosure had higher chlorophyll levels, as well an enhanced growth. Following treatment, these trees have enhanced capacity to absorb $CO_2$. Based on an average 20% increase in chlorophyll concentration per growing season, over a number of years a treated tree will have significantly more $CO_2$ capture and utilization than an untreated tree. A comparable effect will be seen in other species, including ornamental and agricultural plants.

Two specific formulations, one using dry ground calcium carbonate and the other using wet ground calcium carbonate, can be prepared as follows (Tables 3 and 4). The procedure can use standard vacuum centrifuge equipment as needed for de-aeration. An additional formulation is referred to as "calcium with calcium acetate" having the formulation shown in Table 5 below.

TABLE 3

Dry ground: CCCDGFW-T formulation method

| Ingredient | W/W % | Procedure - Add in order below to paddle mixing vessel |
|---|---|---|
| Potable water | 30.08 | Begin Agitation |
| Dispersogen PCE | 0.95 | Mix to disperse |
| Soy Lecithin | 2.71 | Mix to disperse |
| Sodium carbonate | 0.38 | Mix to disperse |
| CCCDG | 58.43 | Mix to disperse |
| Alcohol (ethanol or isopropanol) | 2.14 | Mix to disperse |
| Clove Oil | 0.19 | Mix to disperse |
| Guar Gum | 0.12 | Mix to disperse + 1 hour De-aerate at least one hour |
| Titanium dioxide | 5.00 | Shear mix to disperse |
| Total | 100.00 | |

TABLE 4

Wet ground: CCCWGFW-T formulation method

| Ingredient | W/W % | Procedure - Add in order below to paddle mixing vessel |
|---|---|---|
| Potable water | 14.44 | Begin Agitation |
| Esperse 366 | 1.00 | Mix to disperse |
| Titanium dioxide | 5.00 | Mix to disperse |
| CCCWG @ 74% Calcium Carbonate | 78.96 | Mix to disperse |
| Silicone PMX200 | 0.25 | Mix to disperse |
| Mergal K10N | 0.15 | Mix to disperse |
| Mergal 186 | 0.10 | Mix to disperse |
| Guar Gum | 0.10 | Mix to disperse + 1 hour |
| Total | 100.00 | |

TABLE 5

Calcium with Calcium Acetate

| Ingredient | Wt % |
|---|---|
| Potable water | 32.7 |
| Calcium hypochlorite | 0.02 |
| PCE | 0.50 |
| Esperse 366 | 1.00 |
| Calcium acetate | 3.00 |
| RDI-S Titanium dioxide | 4.00 |
| Vansil W-50 | 3.50 |
| 11 HX Calcium Carbonate | 54.5 |
| XP 2450 | 0.22 |
| Clove oil | 0.04 |
| Si Absorbe or PMX Silicone | 0.27 |
| Mergal K10N | 0.15 |
| Mergal 186 | 0.10 |
| Total | 100.00 |

Procedure for mixing for Table 5:
1. Load water and begin agitation.
2. Load calcium hypochlorite and continue agitation.
3. Load PCE and mix 2 hours to hydrate.
4. Reduce agitation speed to minimum, slowly add Esperse 366 and mix slowly for 10 minutes to disperse well.
5. Load clove oil and continue mixing.
6. Load silicone (Si Absorbe or PMX 200) and continue mixing.
7. Load Mergal K10 N and continue mixing slowly.
8. Load Mergal 186 and continue mixing slowly for one hour.
9. Measure specific gravity at 25° C. The specific gravity should be approximately 13.3.

The specific amounts in Tables 3, 4 and 5 above are exemplary of preparations used in the methods of the Examples. The amounts can be varied according to the following ranges, Tables 6 and 7:

TABLE 6

Dry ground: CCCDGFW-T ranges for components

| Ingredient | W/W % |
|---|---|
| Potable water | 25.65-74.35 |
| Dispersogen PCE | 0.5-1.0 |
| Soy Lecithin | 2.0-3.0 |
| Sodium carbonate | 0.2-0.5 |
| CCCDG | 58-61.5 |
| Alcohol (ethanol or isopropanol) | 1.5-3 |
| Clove Oil | 0-0.2 |
| Guar Gum | 0.05-0.15 |
| Titanium dioxide | 0.5-5 |

TABLE 7

Wet ground: CCCWGFW-T ranges for components

| Ingredient | W/W % |
|---|---|
| Potable water | 8.85-20.85 |
| Esperse 366 | 0.5-1 |
| Titanium dioxide | 0.5-5.0 |
| CCCWG @ 74% Calcium Carbonate | 78-84 |
| Silicone PMX200 | 0.1-0.5 |
| Mergal K10N | 0-0.25 |
| Mergal 186 | 0-0.25 |
| Guar Gum | 0.05-0.15 |

Mergal K1 ON is a VOC-free, water-based preservative to prevent deterioration and degradation caused by bacteria and fungi, and Mergal 186 is a clear, water soluble liquid preservative for control of bacteria in aqueous-based systems (Troy Corporation, Florham Park, N.J., 07932, USA). Guar gum and xanthan gum may be interchanged or used in combination as a thickener, and are a non-limiting examples suitable for use herein.

The Esperse 366 product (Ethox Chemicals, LLC, Greenville, N.C. 29605, USA) is an alcohol C12-16 poly(1-6) ethoxylate. Other classes of emulsifiers such as Esperse products having similar characteristics can optionally be substituted. As used in CCCWGFW-T formulations herein, it can optionally be used interchangeably with the emulsifier product Rheovis® AT 120 (BASF Corporation, Florham Park, N.J. 07932, USA).

Dispersogen PCE in CCCDGFW-T formulations can be used interchangeably with other dispersing agents in the chemical family of polycarboxylate ethers (Clariant Corporation, Charlotte, N.C., 28205, USA). Silicone PMX200 (Dow Corning Corp., Midland, Mich. 48686, USA) as used in CCCWGFW-T formulations herein is a silicone and can be optionally substituted with other silicones having comparable characteristics.

XP-2450 (acrylic polymer) is a polyacrylic dispersing agent. Suitable polyacrylic dispersing agents include those available from Coatex (Chester, DC, USA): Ecodis™, Rheosperse™ 3620, Ecodis™ P 30, Coadis™ BR 85, Coadis™ 144 A, and Coadis™ 123 K.

3. Extrapolation to Large-Scale Carbon Sequestration by Treated Plants and Trees.

The disclosure is directed to reducing or preventing chloroplast movement which occurs in plants in response to bright sunlight. Relevant to carrying out this process on a national and global scale, the present studies of the movement of chloroplasts show that the movement can be experimentally controlled and measured, and, as a result, the capture of atmospheric $CO_2$ is enhanced. When this is done on the scale of agricultural and forest product growth, meaningful reduction in the Earth's atmospheric $CO_2$ levels are achievable. Projected calculations are provided in Examples 2 and 3.

Psaltis, D. et al. (APL Photonics 1:020901-1-11, 2016) studied the mechanism of chloroplast movement in the houseplant Calathea. In bright light, chloroplasts aggregated near the side membrane of a plant cell. However, the chloroplasts appeared evenly distributed in the cells that had not been exposed to light. By aggregating near the membrane, the chloroplasts shaded each other and dramatically reduced the light absorption cross section of the cell.

Several advantages to the plant are achieved by the chloroplasts' ability to move within the plant cells, including avoiding thermal damage, avoiding photobleaching, DNA damage, and other potential damage from high light intensity. As noted above, this reaction has been identified as "chloroplast avoidance motion." (Kasahr, M. et al., Nature 420:829-832, 2002.) However, this avoidance mechanism is a disadvantage for the goal of maximizing photosynthesis to reduce excess atmospheric $CO_2$ on an internationally meaningful scale.

Further studies have demonstrated the mechanism for the chloroplast avoidance motion. When light is absorbed by chlorophyll, ATP and the cofactor dihydronicotinamide-adenine dinucleotide phosphate (NADPH) are produced in the thylakoid of the chloroplast. "Thylakoid" refers to the intracellular compartments in which chloroplasts are embedded. Excess hydrogen cations are produced and transferred across the thylakoid membrane.

This process generates an electrochemical proton gradient, which is catalyzed by the ATP synthase enzyme to generate ATP. The ATP powers the molecular motors in conjunction with proteins in the PHOT 1 and PHOT 2 processes. Although the chloroplast avoidance movement may seem arbitrary when strong light is present, it results in accumulation of chloroplasts at the edges of the cells, protection of the chloroplasts, and a consequent reduction in photosynthetic activity.

The chloroplast movement allows the leaf to dynamically adapt to optimize use of the available solar energy, while minimizing harm from overexposure to light. However, from the perspective of using plants commercially to reduce atmospheric $CO_2$, the chloroplast avoidance motion is a disadvantage.

The compositions and methods of the present disclosure provide a solution to this disadvantage, by light scattering and reducing and/or preventing the daytime avoidance of light. As discussed in detail in the Examples, Enhanced $CO_2$ Capture and Storage (referred to herein as ECCS) was achieved by treating plant leaves with a flowable agricultural formulation of calcium carbonate and titanium dioxide. Although the compositions are not limited to the particular sources of materials disclosed herein, a suitable source of titanium dioxide, as used in the Examples, is Sachtleben (Rockwood Holdings, Inc., Pori, Finland). The product (also referred to herein as "T-D") is referred to as Sachtleben RDI-S, alumina surface treated rutile titanium dioxide pigment, CAS number 13463-67-7. "Rutile" refers to a mineral composed of titanium dioxide and having one of the highest refractive indices among known crystals.

This titanium dioxide treatment product has the following properties as shown in Table 8:

TABLE 8

| Property | Value |
| --- | --- |
| Refractive index | 2.7 |
| Relative tint reducing power | 1900 |
| Oil absorption [g/100 g pigment] | 21 |
| $TiO_2$ content [%] | 95.0 |
| Surface treatment | $Al_2O_3$, organic |
| pH | ~7.0 |
| Moisture when packed [%] | Maximum 0.5 |
| Crystal size (mean) [nm] | ~220 |
| Specific gravity [g/cm$^3$] | 4.0 |
| Bulk density [g/cm$^3$] | 800 |
| Bulk density (tamped) [g/cm$^3$] | 1000 |

To distinguish titanium dioxide useful in practicing the present invention from other less preferred titanium dioxides, titanium dioxide useful in practicing the present invention is rutile with a surface treatment of $Al_2O_3$, nitrogen or manganese doping, and a crystal particle size from about 10 nm to about 500 nm verified for example by SEM photography. Dispersing was tested in 95% w/w calcium carbonate base formulation: 5% w/w $TiO_2$ candidate for mixing and bloom when diluted as a 4% solution in water for field application. Poor dispersing characteristic renders the titanium dioxide unusable. Stability was determined as follows: mixed samples of dispersed titanium dioxide samples were stored at 112° F. for two weeks and checked for hard pack and polymerization. Stable samples resulted in no hard pack or excessive bleed layer.

Other suitable titanium dioxides are listed in Table 9 below:

TABLE 9

| $TiO_2$ | Dispersing | Oven Stability | Pass for Chloroplast Effect |
| --- | --- | --- | --- |
| CCR200Mn | Good | Stable | Yes |
| 400WP | Good | Stable | Yes |

TABLE 9-continued

| $TiO_2$ | Dispersing | Oven Stability | Pass for Chloroplast Effect |
|---|---|---|---|
| RDI-S | Good | Stable | Yes |
| 550 | Good | Stable | Yes |

According to the results described herein, it is preferable for $TiO_2$ particle size to have a distribution of from about 10 nm—about 500 nm.

Photocatalysis is a third mechanism to increase $CO_2$ sequestration, in addition to light scattering/diffraction and inhibition of chloroplast movement. With absorption of blue and near UV light, and thereby providing inhibition of movement by foliar chloroplasts, foliar $TiO_2$ nanoparticles store the absorbed electromagnetic (EM) energy. This stored energy can then become an energy source for photocatalysis. Photocatalysis occurs when absorbed and stored EM energy enables a chemical reaction which would otherwise not occur; and the photocatalyzing particle then returns to its original state. Photocatalysis by $TiO_2$ nanoparticles occurs because these particles are semiconducting nanocrystals (Yan Wang, et. al., Nanoscale Res. Lett., 11:529, 2016).

Photocatalytic processes are described for example in Liu, C. et. al., Frontiers in Plant Science 8:489, 2017. For a given plant species, the benefit of $TiO_2$ photocatalysis is dependent upon plant physiology and plant health. Plant physiology and plant health are not critical to the increase in $CO_2$ sequestration provided by foliar light scattering/diffraction and inhibition of foliar chloroplast movement, which are equally effective for a wide variety of plant species. Without being bound by a specific mechanism, photocatalytic benefits are achieved by use of foliar $TiO_2$ compositions as disclosed herein.

Wherein the titanium dioxide particle size parameters are limited, the $CaCO_3$ can have a wider particle size distribution. To distinguish calcium carbonate useful in practicing the present invention from other less preferred calcium carbonates, calcium carbonate useful in practicing the present invention has a particle size ranging from about 200 nm to about 3 microns verified, for example, by SEM photography.

A suitable source of calcium carbonate is Imasco Minerals, Inc. (Surrey, BC, Canada). Another suitable source is Specialty Minerals (Lucerne Valley, Calif., USA), products including Vicron® fine ground calcium carbonate, and VICALity™ Extra Light USP/FCC Precipitated Calcium Carbonate. If precipitated calcium carbonate is used, it can be advantageous to include calcite in an amount of 10%-50% of the composition, by weight.

Other sources include Graymont Minerals (Richmond, BC, Canada) and Omya (Oftringen, Switzerland). The content is limestone (CAS 1317-65-3) at a concentration of over 99.9% (% w/w) and crystalline silica, quartz (CAS 14808-60-7), an impurity present at less than 0.1% concentration (% w/w). The product is available at a range of sizes (200X, 3HX, 4HX, 6HX, 7HX, and 11 HX). Without being limited to a particular product, the 11 HX product is used in compositions disclosed herein.

The 11 HX $CaCO_3$ has the following characteristics: dry brightness: 95; specific gravity: 2.7; bulk density, loose: 0.50 g/cc (31 lb/cu. ft.); bulk density, packed: 0.70 g/cc (44 lb/cu. ft.); Mohs hardness: 3.0; particle shape: crystalline rhombohedron; moisture content: <0.2%.

For preferred ECCS formulations containing calcium carbonate, a surfactant package is chosen to well-disperse the particles to ensure even distribution (anti-agglomeration of calcite and rutile titanium dioxide). This distribution in combination with size of both particles is important for expanded band width absorption to effect the foliar chloroplast light avoidance.

A preferred flowable agricultural calcium carbonate product for use with $TiO_2$ may be CCCDGF or CCCWGF, which use separate surfactant chemistry. CCCDGF successfully utilizes soy lecithin and Dispersogen PCE. CCCWGF successfully utilizes Ethox Esperse 366 and Silicone PMX Series. Dispersogen PCE is an ether carboxylate, and Ethox Esperse 366 is an alkyl ethoxylate.

Plants that are suitable for application of the materials disclosed herein include agricultural plants, ornamental plants, small and large-scale woods and forests, grasses, and other landscape plants. The data obtained with specific plants described herein is exemplary and not intended to be limiting in terms of applicability of the compositions and methods generally.

The disclosed materials and methods are consistent with and promote goals of the Paris Agreement by fulfilling carbon reduction schemes, cap and trade programs, carbon credits via carbon offset and capture, while increasing food production. The disclosure utilizes the earth's current biomass for Carbon Capture, Utilization & Storage (CCUS) with no change to existing global infrastructure. The disclosed methods are suitable for providing governments, businesses and individuals the opportunity to balance their carbon footprint through the reduction of greenhouse gases.

The carbon dioxide ($CO_2$) concentration in the atmosphere is now close to 400 ppm, which is significantly higher than the pre-industrial level of about 300 ppm. US Department of Energy (USDE) tests showed 386-388 ppm in 2010. The global mean $CO_2$ concentration is currently rising at approximately 2+ ppm/year.

As shown in FIG. 1, photosynthesis is the process by which photosynthetic plants utilize light to build carbohydrates and other organic molecules from carbon dioxide ($CO_2$) and water ($H_2O$). Photosynthesis is the mechanism to capture carbon utilized by plants, and the actual mass of carbon captured and sequestered by tree roots, forest mass and agricultural crops is in the trillions of tons. Additionally, carbon absorbed from the air makes up 45-50% of plant dry weight. By daily upregulating of both photosynthesis and carbon draw by the plants, there is continual use of atmospheric $CO_2$ to make up the 45-50% carbon in plant mass/weight.

This disclosure accordingly provides a new approach for enhancing $CO_2$ trapping (carbon capture) from the air while naturally increasing the oxygen in the atmosphere and diluting the concentration of greenhouse gasses. The action of ECCS reflects 5% of the direct sunlight back to the atmosphere, naturally reducing excess heat to the plant and earth surfaces. The cyclic action consequently promotes more photosynthesis and water use efficiency of plants.

For the purpose of calculating the efficacy of ECCS compositions for upregulating the photosynthetic process, it should be noted the actual plant use of carbon is 45-50 times greater than the 1% use for chlorophyll. It can be shown by a series of projected calculations (Examples 2 and 3) that upregulating photosynthesis relates to biomass yield increase.

The Earth's atmospheric weight is 5.5 quadrillion tons and percentages of elements are as follows, based on pre-industrial atmosphere composition (approx.) as shown in Table 10. Returning the oxygen and carbon dioxide levels to closer to pre-industrial percentages remains a goal of any technology aimed at reducing greenhouse gases.

TABLE 10

| Component | Symbol | Volume |
|---|---|---|
| Nitrogen | $N_2$ | 78.084% |
| Oxygen | $O_2$ | 20.947% |
| Argon | Ar | 0.934% |
| Carbon Dioxide | $CO_2$ | 0.033% |

In summary, the ECCS compositions help inhibit the light avoidance movement by foliar chloroplasts. In one embodiment, the procedure involves applying, such as spraying, the ECCS formulation onto leaves and stems of crops by using commonly known agricultural application techniques. Crop responses to increased carbon capture include increased biomass accumulation, increased yield, improved water use efficiency and increased oxygen ($O_2$) in the air, which dilutes the concentration of greenhouse gases.

The increase in diffraction/scattering of light increases the participation in photosynthesis by foliar chlorophyll chromophores. The specific formula of ECCS results in absorption of blue and near UV light.

Visual observations and scanning electron microscope images can be used to verify foliar chloroplast light avoidance movement. Exposure of a thin leaf to laser light for a sufficiently long time yields visual evidence of light avoidance movement by foliar chloroplasts. When a leaf thus exposed is removed from the leaf holder, a lighter green color is observed at the exposed area of the leaf. The decrease of green color within the exposed area is due to a decrease in absorption of light, in the exposed area, by chlorophyll chromophores. The decreased absorption by chromophores is due to the fact that a significant fraction of foliar chloroplasts have been hidden by the foliar chloroplast light avoidance movement.

Using the experimental apparatus shown in FIG. 2, the exposure time required for visual observation of the foliar chloroplast light avoidance movement ranges from a few minutes to approximately one hour, with the exact time being determined by leaf thickness and other factors that vary with leaf type and laser power. It is noteworthy that, within approximately thirty minutes, the exposed area of a leaf returns to its original color, which indicates that the laser exposure has not damaged the leaf.

Figure 3A:
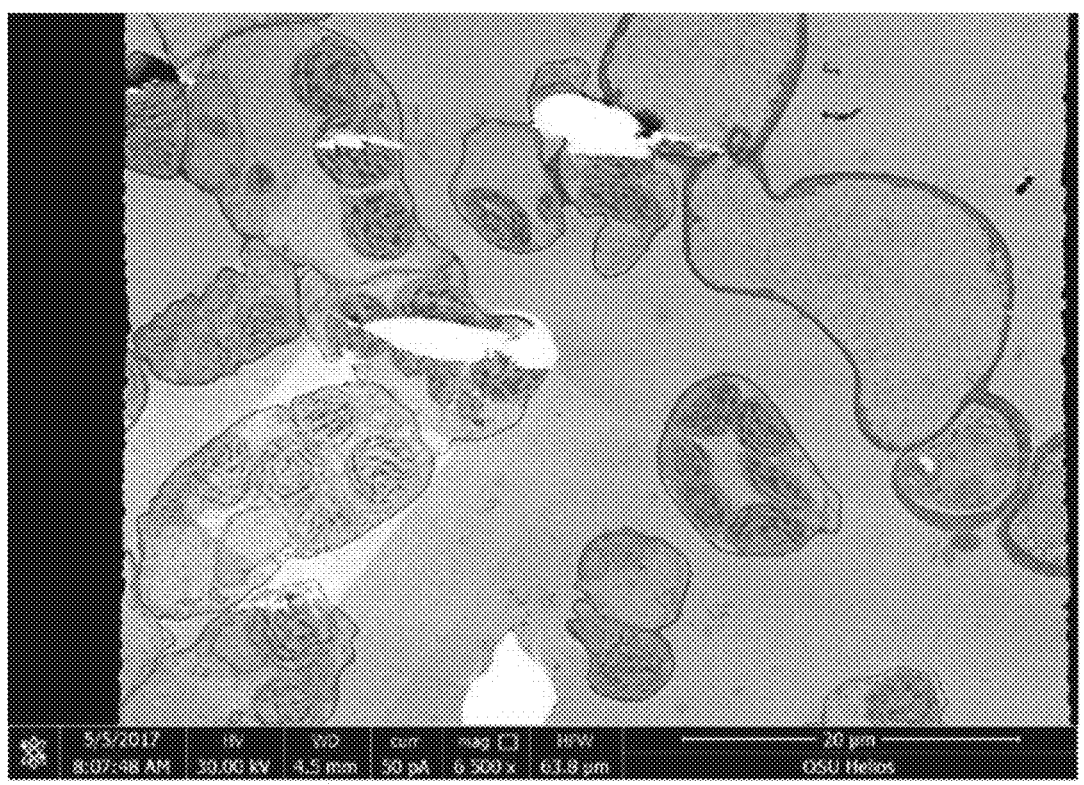
FIGS. 3A-C show foliar chloroplast movement in Nasturtium leaves.
Figure 3B:
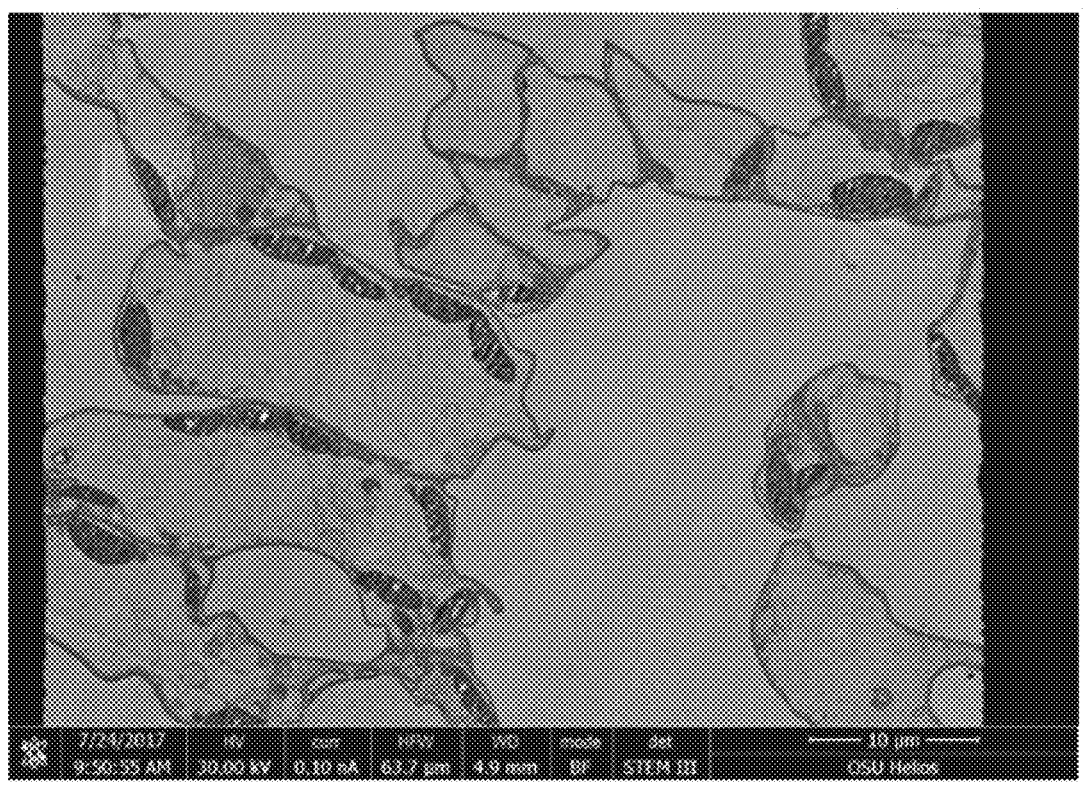
Figure 3C:
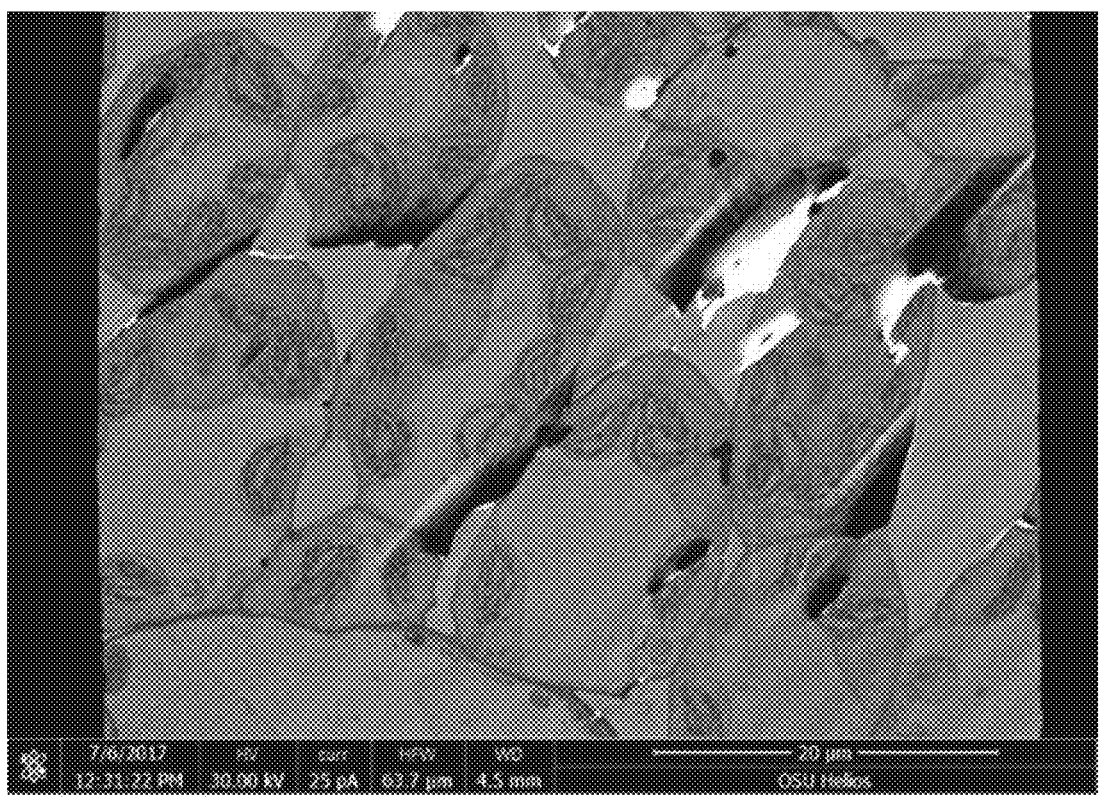

Additional verification of the light avoidance movement by foliar chloroplasts is obtained from scanning electron microscope (SEM) images of selected cross sections of unexposed leaves and leaves exposed to the 405 nm laser beam. Typical SEM images for cross sections from untreated and treated leaves are shown in FIGS. 3B and 3C, respectively.

This disclosure also relates to enhancing strong diffraction which provides excitation of a much larger fraction of available chlorophyll chromophores than does direct sunlight, and the resulting increase in photosynthesis is a significant benefit. (U.S. Pat. No. 9,185,848). As described in the Examples, the method of this disclosure increases a plant's photosynthetic capacity by foliar chloroplast strong light avoidance movement.

Chlorophyll production and the increases resulting from the disclosed treatment can be measured using known methods, for example as disclosed in Gitelson A. A., et al., "The Chlorophyll Fluorescence Ratio F735/F700 as an Accurate Measure of Chlorophyll Content in Plants," Remote Sens. Enviro. 69:296-302 (1999). Chlorophyll meters are available commercially, for example from Optisciences, Inc., Hudson, N.H. 03051, USA. The CCM-300 meter is suitable for small leaves and conifer needles, and the CCM-200 plus meter is suitable for medium size and larger leaves.

This technology is based on chlorophyll absorption of a blue fluorescence excitation light, and emission of a range of fluorescing light at longer wavelengths. By comparing the ratio of fluorescence emission at 735 nm and at 700 nm, there is a linear response to chlorophyll content in a range from 41 mg $m^{-2}$ to 675 mg $m^{-2}$. This method does not compare transmission through a leaf at two different wavelengths, so thick samples can be measured. In addition, the fluorescence is measured on the same side of the sample as the excitation light. For these reasons, fluorescence is a suitable method of measurement for leaves smaller than the measuring aperture like immature rice and turf grasses, and samples with curved surfaces like white pine needles.

The flowable agricultural formulas of the disclosure can be administered once or more during a growing season, with coverage of at least 15%, at least 50%, or up to 100% of the surface of the plant leaves and stems, and any percentage range between. The percent coverage can be determined by the degree to which enhanced photosynthesis is desired for a particular plant.

For conifers, a single application is expected to be sufficient. Other plants may require reapplication, for example once every four weeks approximately, to cover new lateral growth and new vertical growth. Such determinations are within the skill of the art, using existing knowledge of plant growth rates, and adjusted as needed based on the rate of growth in a particular season, depending on amount of sunlight and other parameters.

Reapplication following rain, wind and other weather conditions is not expected to be required, in view of the ability of the particles in formula to closely coat the leaf surfaces.

Oxalis, Nasturtium, five species of trees, and two vegetable species are used as test species in these Examples, but the methods and compositions are not limited to these species.

Figure 6:
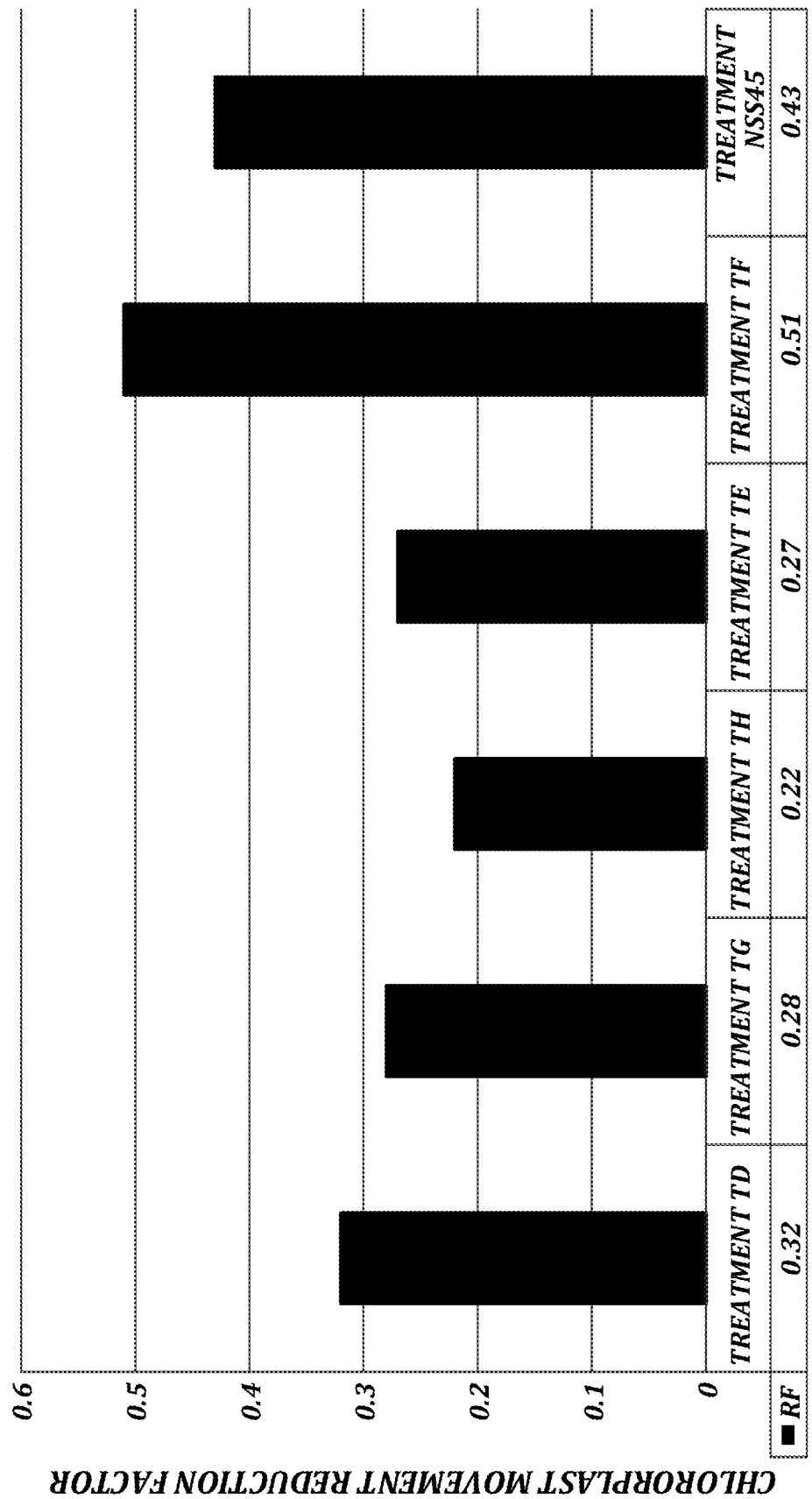
FIG. 6.
Figure 7:
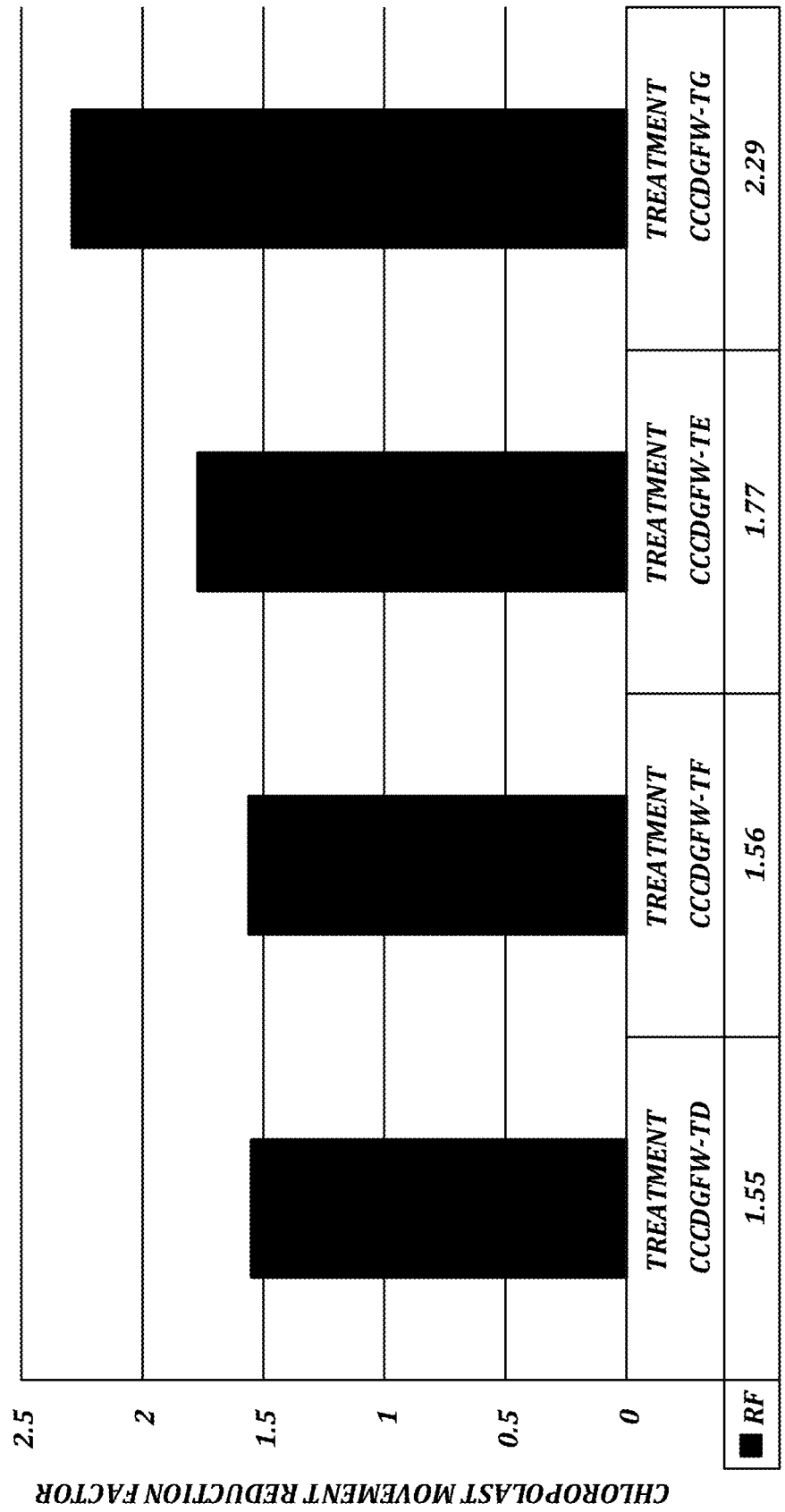
FIG. 7.
Figure 8:
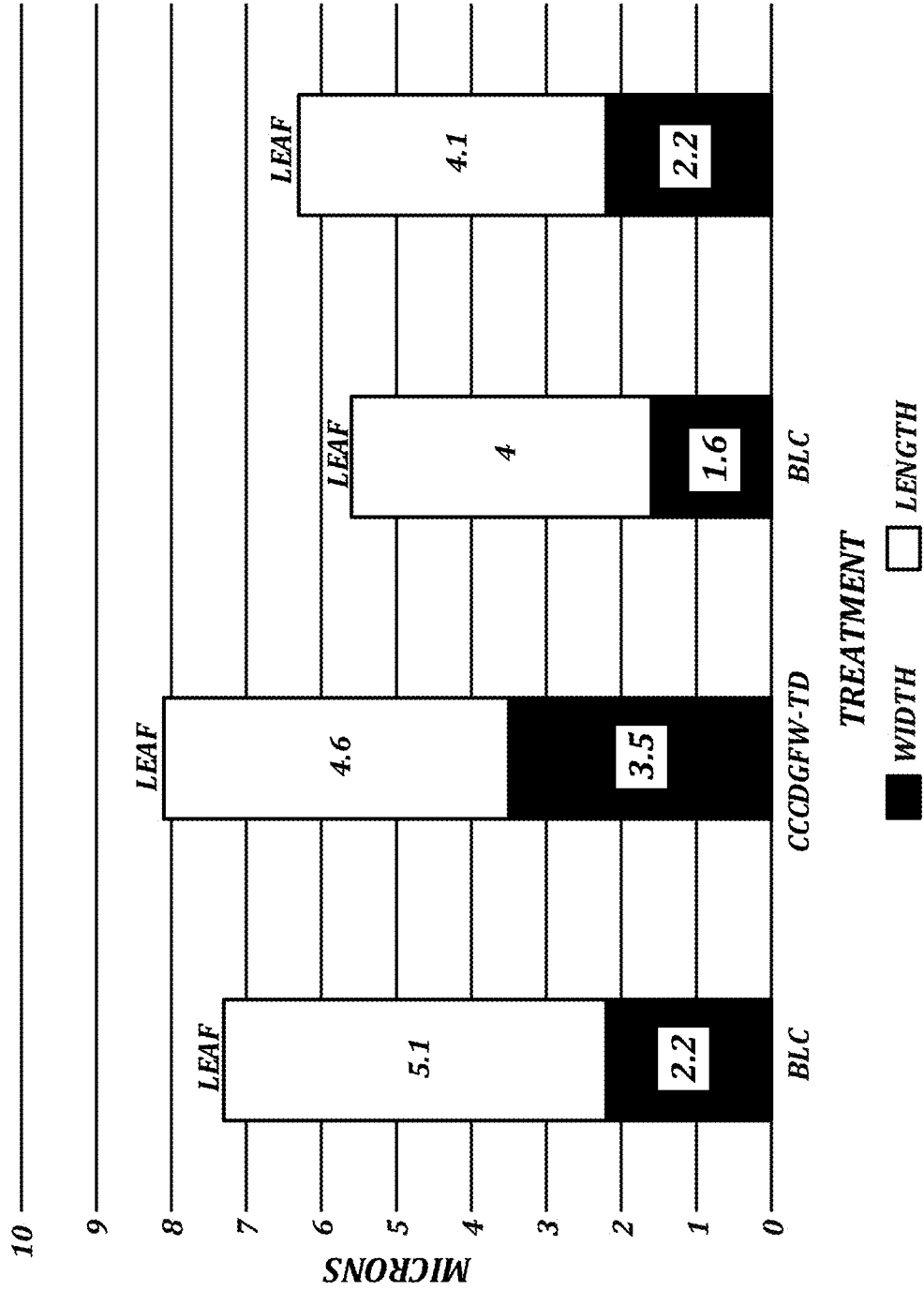
FIG. 8.
Figure 9:
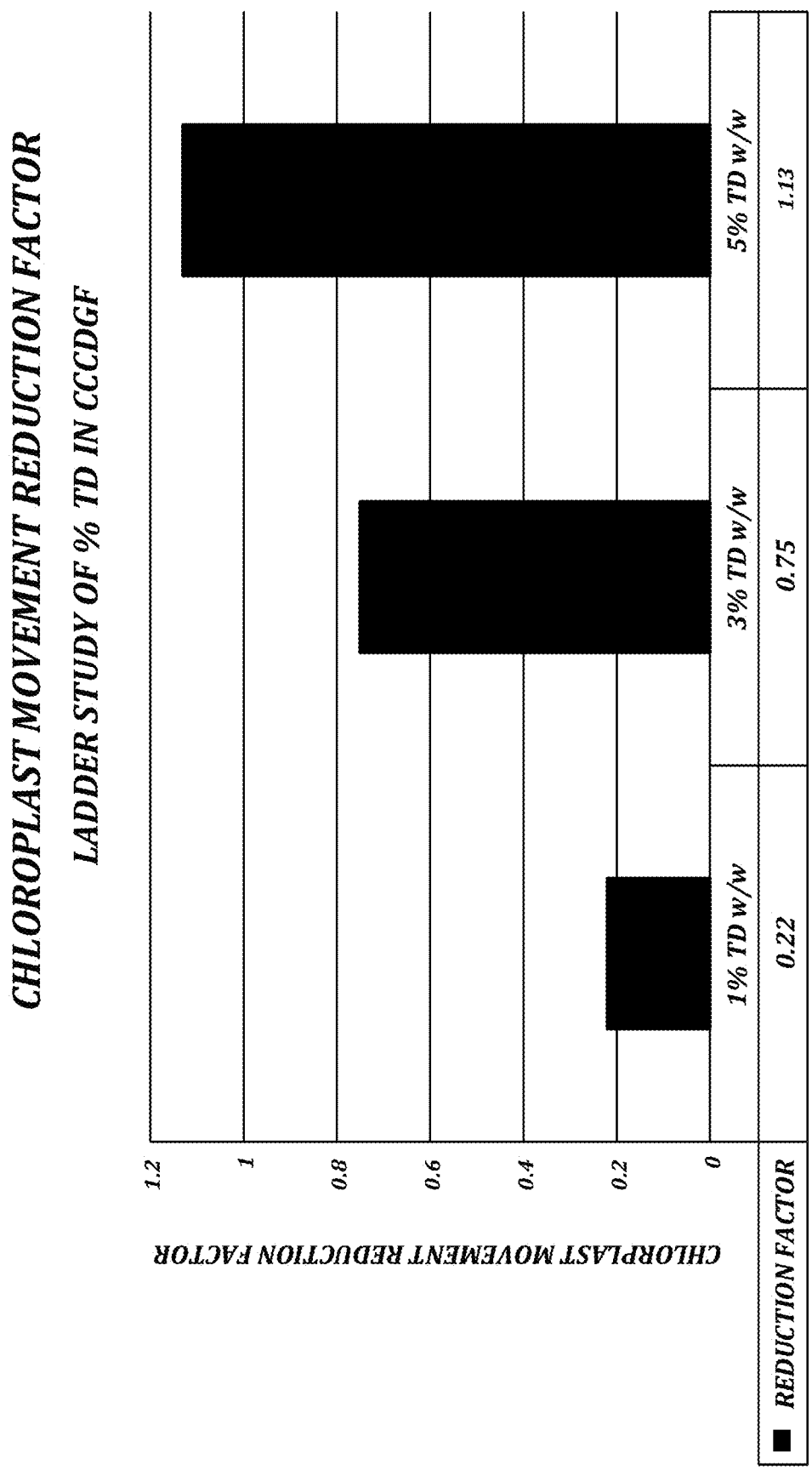
FIG. 9.

The disclosure also provides a new method to evaluate sun creams (sunscreens) for human use for UV protection. In the experiment shown in FIG. 6, Neutrogena® sunscreen SPF (NSS45) was tested undiluted for its ability to reduce chloroplast movement within Oxalis leaves. The treatment yielded a reduction factor of 0.43. This system of measuring the effect of a leaf treatment on chloroplast movement that otherwise occurs in the presence of sunlight can therefore be useful in testing and comparing the sunscreen potential of other compositions.

The Examples below are included to demonstrate particular embodiments of the disclosure. It should be appreciated by those of ordinary skill in the art that the compositions and techniques disclosed in the Examples represent compositions and techniques found by the inventors to function well in the practice of the disclosure, and thus can be considered to constitute preferred modes for its practice. However, those of ordinary skill in the art should, in light of the present disclosure, appreciate that many changes can be made in the specific particular embodiments which are disclosed and still obtain a like or similar result without departing from the spirit and scope of the disclosure.

EXAMPLES

Example 1. Preparation of ECCS Formulation

ECCS is formulated with ultrafine wet or dry ground or precipitated calcium carbonate derived from calcite and titanium dioxide employing a dispersion surfactant package and stabilizers. As discussed in the Detailed Description, calcium carbonate useful in practicing the present invention preferably has a particle size ranging from 200 nm to 3 microns verified, for example, by SEM photography.

Experiments were performed to study the effects of $TiO_2$ and $CaCO_3$ formulations on the same leaf surfaces. To study these parameters, a formula ladder study of $TiO_2$ ranging from 0.1 wt % to 5 wt % was tested with $CaCO_3$ at 60 wt %. Foliar chloroplast avoidance was noted for all ranges of the rutile surface-treated $TiO_2$, as compared to the water control test of the same leaf. In this preliminary experiment, the best results were obtained with Cinkaran 220 Mn and Sachtleben RDI-S formulated with 60 wt % $CaCO_3$. In subsequent experiments other formulations achieved as good or better results.

The foliar chloroplast avoidance movement was the mode of action according to the present Example regardless of the $TiO_2$ source. Minimal foliar chloroplast avoidance movement was observed using $TiO_2$ in water alone as shown in FIG. 6. Avoidance movement was at the lowest detectable amount using $CaCO_3$ in water alone.

Example 2

This example is on a small scale of one acre and is based on the following premises. (1) An average above ground crop yields 10,000 lb. of spinach/acre. (2) Spinach contains about 1% of chlorophyll (Chl). (3) The average molecular weight of chlorophyll is 881 g/mole. (4) The chlorophyll molecule has 55 carbons. (5) The molecular weight of $CO_2$ is 44 g/mole. (6) The molecular weight of $O_2$ is 32 g/mole.

Calculations for Non-Treated Plants:

1. 10,000 lb. spinach/acre=4,545 kg spinach/acre=45.45 kg Chl/acre
2. 45.45 kg Chl/acre=45,450 g Chl/acre=51.6 mole Chl/acre
3. 51.6 mole Chl/acre=2,838 mole carbon/acre=125 kg $CO_2$/acre=275 lb. $CO_2$/acre
4. For each mole of $CO_2$ taken up, one mole of $O_2$ is released Conclusion: 275 lb. $CO_2$/acre×(32/44)=200 lb. $O_2$/acre, pre-treatment Benefit of ECCS treatment at twenty percent more chlorophyll synthesized by the plant Results:

1. 275 lb. $CO_2$/acre×0.2=55 lb. more $CO_2$/acre taken up from the atmosphere
2. 200 lb. $O_2$/acre×0.2=40 lb. more $O_2$/acre given up to the atmosphere There are at least 938 million acres of prime agricultural land and forest in the United States. Applying the calculations above to one million acres of prime Douglas Fir mixed canopy forest containing 100 thousand pounds of chlorophyll-producing biomass will yield the following results as shown in Example 3, based on the one acre illustration of spinach in Example 2.

Example 3

This example is a large scale projection based on one million acres. A Douglas fir forest canopy is 7.5 to 75 times more productive of photosynthesis than spinach; one acre of ECCS-treated Douglas fir forest at 75,000 pounds canopy mass will produce the following results, based on 7.5× compared to spinach:

Results:

1. 275 lb. $CO_2$/acre×0.2=55 lb.×7.5=412.5 pounds more $CO_2$/acre taken up from the atmosphere than by chlorophyll alone.
2. 200 lb. $O_2$/acre×0.2=40 lb.×7.5=300 pounds more $O_2$/acre given up to the atmosphere than by chlorophyll alone.

Extrapolating these results to one million acres of treated Douglas fir provides the following results:

1. 206,250 tons more $CO_2$/acre taken up from the atmosphere than for chlorophyll alone, and 206,250 tons throughout the year, yielding a 20% increase.
2. 150,000 tons more $O_2$/acre given up to the atmosphere than for chlorophyll alone; 300 tons more oxygen/acre, and up to 450,000 tons oxygen in conifers.

By treating 938 million acres of prime agricultural land and forest in the United States, the following effect on the atmosphere can be achieved:

1. 193,462,500 tons more $CO_2$ taken up from the atmosphere than for chlorophyll alone.
2. 140,700,000 tons more $O_2$ given up to the atmosphere than for chlorophyll alone.

These examples are calculated based on one standard application per season of ECCS and are not inclusive of all biotic factors associated with plant growth and reflected light. They also will depend on the composition of a mixed forest, in which a proportion of the trees are deciduous. Carbon absorbed from the air makes up 45-50% of plant dry weight. Photosynthesis is merely the machine to capture carbon utilized by plants, and the actual mass of carbon captured and sequestered by tree roots, forest mass and agricultural crops are in the trillions of tons.

Example 4. Chlorophyll Levels in Treated and Untreated Trees Including Conifers Five tree species typically found in Pacific Northwest forests obtained from Brooks Tree Farm (Brooks, Oreg.) were treated with CCCWGFW-TD. The five species are: Douglas Fir, Port Orford Cedar, Noble Fir, *Ponderosa* Pine and Oak. 25 of each species were used, as second year seedlings in 2-inch containers with slow release fertilizer.

Four trees of each species were matched for size and form, and then planted in 12 inch pots, two trees per pot. One pot of each species was selected for treatment and the other remained non-treated. Treated trees were sprayed with a 4% solution of the formulation of Table 5, then all the 12-inch pots were placed in a sunny location to receive maximum solar radiation.

The trees were watered every few days and evaluated for condition and effect of the spray at Week 1. All trees were healthy, and initially no difference was found between treated and non-treated. Prior to Week 4, growth differences became evident. The treated Douglas Fir was several inches taller and broader than the non-treated. The treated *Ponderosa* Pine was fuller and darker than the non-treated.

At Week 8, evaluation of the chlorophyll content was performed using Opti-Sciences CCM-300 chlorophyll fluorescence meter which measures the ratio of fluorescence between the 700 and 735 nm wavelengths of light.

Needles were cleaned of dried formula application immediately prior to measurement. For the Douglas Fir, *Ponderosa* Pine and Noble Fir, a variety of needles were chosen from upper, middle and lower portions of the seedlings and then two readings were taken in each of three locations on each needle: the base, middle and near the end on as much as possible the top (sun facing) portion of the needles. The readings were averaged and then evaluated.

The Port Orford Cedar was measured in multiple locations on each of the seedlings as the needles are branched and not straight as in the other three conifers. The Oaks were beginning to senesce, so only the fully green leaves were chosen and multiple readings from three leaves each were taken on the top sides of the leaves.

The results of the averages in chlorophyll content of the needles and leaves are shown in Table 11 below.

TABLE 11

| Species | Chlorophyll concentration (mg/m$^2$) | | Percent increase |
|---|---|---|---|
| | Treated | Non-Treated | |
| Douglas Fir | 228 | 146 | 56% |
| Noble Fir | 297 | 271 | 9.5% |
| Ponderosa Pine | 314 | 256 | 23% |
| Port Orford Cedar | 196 | 162 | 22% |
| Oak | 527 | 434 | 22% |

In conclusion for the first part of this example, the experimental formulation enhanced both growth and chlorophyll content in all five tree species tested at week 8.

The same trees were treated again in the next year's growing season. Treatment was carried out during the second growing season on weeks 1, 3, and 7 using a 3% spray of the formulation shown in Table 5, in which the TiO$_2$ concentration was 4% of the formulation. As noted in Table 12 below, the Douglas Fir new growth received one treatment. 21 weeks after the initial treatment, the chlorophyll content was measured as described above for the week 8 measurements. The results for the five species are shown in Table 12.

TABLE 12

| Species | Chlorophyll concentration (mg/m$^2$) | | Percent increase |
|---|---|---|---|
| | Treated (average of two or more readings) | Non-Treated (average of two readings) | |
| Douglas Fir new growth (one treatment at week 7) | 338, 433, 408, 430 (402.25) | 243, 259 (251) | 60.3% |
| Douglas fir old growth | 341, 328 (334.5) | 217 | 54.1% |
| Noble Fir | 490, 468 (479) | 398, 423 (410.5) | 16.7% |
| Ponderosa Pine | 490, 531 (510.5) | 370, 417 (393.5) | 29.7% |
| Oak | 385, 398 (391.5) | 351 | 11.5% |
| Cedar | 528, 509, 538 (525) | 414, 465, 465 (448) | 17.2% |

In addition to the increase in chlorophyll in all five species tested as shown in Table 12, treated trees demonstrated more second season new growth than the untreated trees.

Example 5. Use of a TiO$_2$ Nanoparticle Foliar Treatment to Inhibit Intercellular Chloroplast Strong Light Avoidance Movement in Peppermint Leaves In the present Example, the avoidance movement of chloroplasts (CPs) inside leaves of peppermint plants is induced using a 405 nm diode laser beam. Light having a wavelength of 405 nm is absorbed by chlorophyll chromophores and by crystalline TiO$_2$. The laser beam intensities used in the present work are in the range 2-10 mW/cm$^2$. At the 405 nm wavelength, the equatorial midday Sun has an intensity of roughly 10 mW/cm$^2$.

In summary, CP avoidance movement was detected visually, by observing a lighter green color on the area of leaf exposure to strong light, and by scanning electron microscopy. The leaves used in the Example were detached from the plant; and they were kept moist at all times. When the CP strong light avoidance movement was observed visually, it was also seen that each leaf returned to its original zero-avoidance state within roughly 30 minutes.

Experimental Apparatus and Procedure

A schematic diagram of the experimental setup used herein is shown in FIG. 2B. Within the plant leaf holder, a leaf is held with its plane perpendicular to the laser beam, and with its adaxial surface within 1-2 mm of the surface of a 1-cm diameter photodiode having its front surface also perpendicular to the direction of the laser beam. The photocurrent of the photodiode is amplified and digitized and fed into a laptop personal computer. The part of the leaf not within the laser beam is in contact, on both sides, with a distilled water moistened pad. Pads are replaced after use with one leaf.

The apparatus is located in a photographic darkroom, with no windows. With the exception of the laser beam, all lights in the darkroom are weak, and plants exposed to these lights are in the weak-light chloroplast accumulation condition (Agarwal, C. et al., PLOS ONE 8:1-11, 2013). Outside the darkroom, peppermint plants are kept in dark enclosures.

Figure 10:
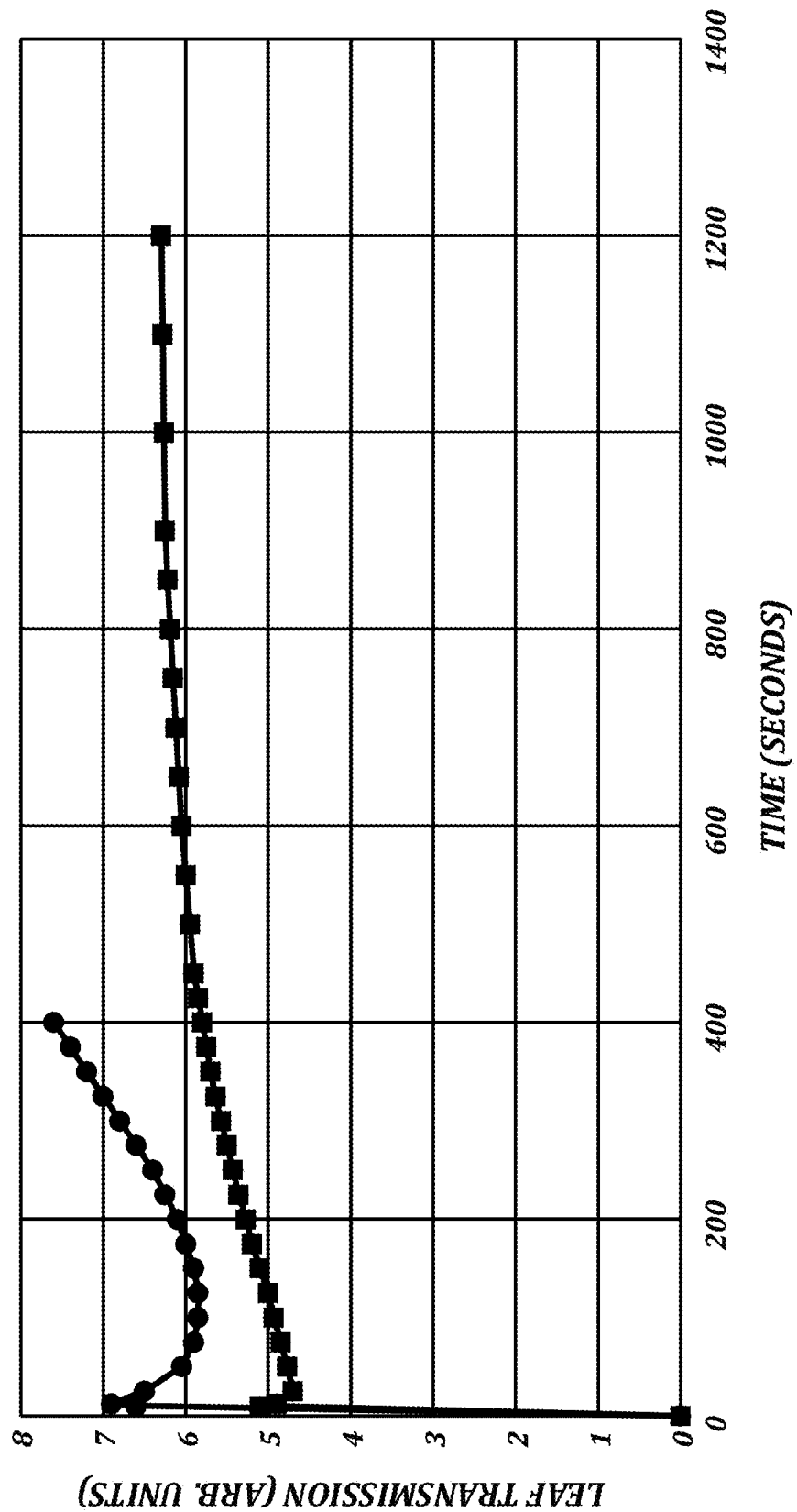
FIG. 10.

Two representative scans of the temporal variation of leaf transmission of the 405 nm laser beam are shown in FIG. 10. These two sets of data were obtained as follows:

1. A peppermint leaf was placed in the leaf holder and the 1-cm diameter portion of the leaf surface to be illuminated by the laser beam was sprayed with distilled water. For the remainder of the procedure, the leaf remained fixed in place in the leaf holder.

2. The exposed leaf surface was air-dried.

3. With the laser beam on, and blocked, the darkroom lights were turned off, and the temporal scan was initiated. No light from the backlight of the laptop was seen by the photodiode.

4. The temporal scan continued as the laser beam was unblocked. This resulted in the sharp initial rise in leaf transmission for both scans shown in FIG. 10.

5. The upper scan shown in FIG. 10 was for a distilled water treatment. The scan continued for 400 sec.

6. The laser beam was blocked, and the exposed leaf surface was air-brush sprayed with a selected leaf treatment. For the data of the lower scan of FIG. 10, the leaf treatment solution consisted of, by volume, 95% distilled water, a 4% mixture of CaCO$_3$ nanocrystals together with a surfactant material (lecithin), and 1% TiO$_2$ nanocrystals. Both types of nanocrystals had an average size dimension of roughly 200 nm.

7. A wait time of 10-20 minutes allowed the leaf treatment to equilibrate, and to provide time for chloroplasts in the leaf area previously exposed to the laser beam to re-accumulate away from cell walls. The weak lights of the laboratory encouraged chloroplast re-accumulation (Agarwal, C. et al., PLOS ONE 8:1-11, 2013).

8. Parts 3, 4, and 5 of the procedure were repeated for the treated leaf. For the data of the lower curve shown in FIG. 10, the total scan time was 1200 seconds.

Results. The principal result of this Example is illustrated by the data shown in FIG. 10. Data points for the upper curve in FIG. 10 are for the initial transmission scan of the leaf.

Henceforth, this peppermint leaf is referred to as leaf #1. For this scan, for leaf #1, the exposed area of the leaf has been sprayed with distilled water, and dried.

For the data of the upper curve of FIG. 10, the decrease in transmission occurring in the temporal region 10-100 sec. was probably dominated by an increasing alignment of chlorophyll chromophore transition dipole moments (TDMs) with the polarization direction of the linearly polarized laser light (Bryant, D. A. et al., J. Phys. B—Atomic, Molecular and Optical Physics 51:49, 2018). Prior to their exposure to the laser beam these TDMs were oriented randomly. Increased alignment yielded increased absorption and, therefore, a decrease in transmission of the laser beam through the leaf.

For scan times greater than 100 sec., the increase in transmission for the upper curve of FIG. 10 was due to strong light chloroplast avoidance movement. The straight-line portion of the curve, for times greater than 200 sec., is in agreement with previous results (Wada, M. et al., Methods in Molecular Biology 774:87-102, 2011; Ahmad, S. et al., Current Plant Biology 13:6-15, 2018). In these previous experiments, a linear increase in leaf transmission, due to chloroplast avoidance movement in strong light, occurred for a time period of roughly 600 sec.

For the data of the lower curve of FIG. 10, the transmission peak near the zero of time was lower in value than that for the upper curve because the leaf was treated with $CaCO_3$ and $TiO_2$ nanoparticles. The $CaCO_3$ nanoparticles scattered the incident light of the laser beam, thereby decreasing the measured transmission of the laser light. The leaf transmission was lowered still further by the $TiO_2$ light absorption at the 405 nm wavelength of the laser.

For the lower curve of FIG. 10, the decrease in transmission occurring in the scan time region 10-40 sec. was probably due mainly to the alignment of chlorophyll chromophore TDMs, as with the data of the upper curve. For scan times greater than 100 sec., the data of lower curve differed markedly from those of the upper curve. There was no straight-line portion of the lower curve, and the transmission curve approached an upper limit of roughly 6.2 (arb. Units).

It is reasonable to assume that the linear portion of the upper curve of FIG. 10 extended to at least 500 sec. Assuming this curve to lose linearity for scan times greater than 500 sec., a transmission limit of roughly 9 (arbitrary units) can be assumed. Thus, for treatment of the leaf with the $CaCO_3+TiO_2$ nanoparticle solution, the increase in laser light transmission due to chloroplast strong light avoidance movement was smaller by roughly one third than it was when the leaf was treated with distilled water.

For leaf #1, a third transmission scan was taken after the $CaCO_3+TiO_2$ treatment was "washed off" using distilled water. The wash-off consisted of spray only. Following a 10-20 min. wait time, a third transmission scan of this leaf was done. For this scan, the transmission peak near the zero of scan time had the same transmission value as for the data of the upper curve of FIG. 10. This indicates that, prior to the third leaf scan, a complete chloroplast weak light accumulation had occurred.

Figure 11:
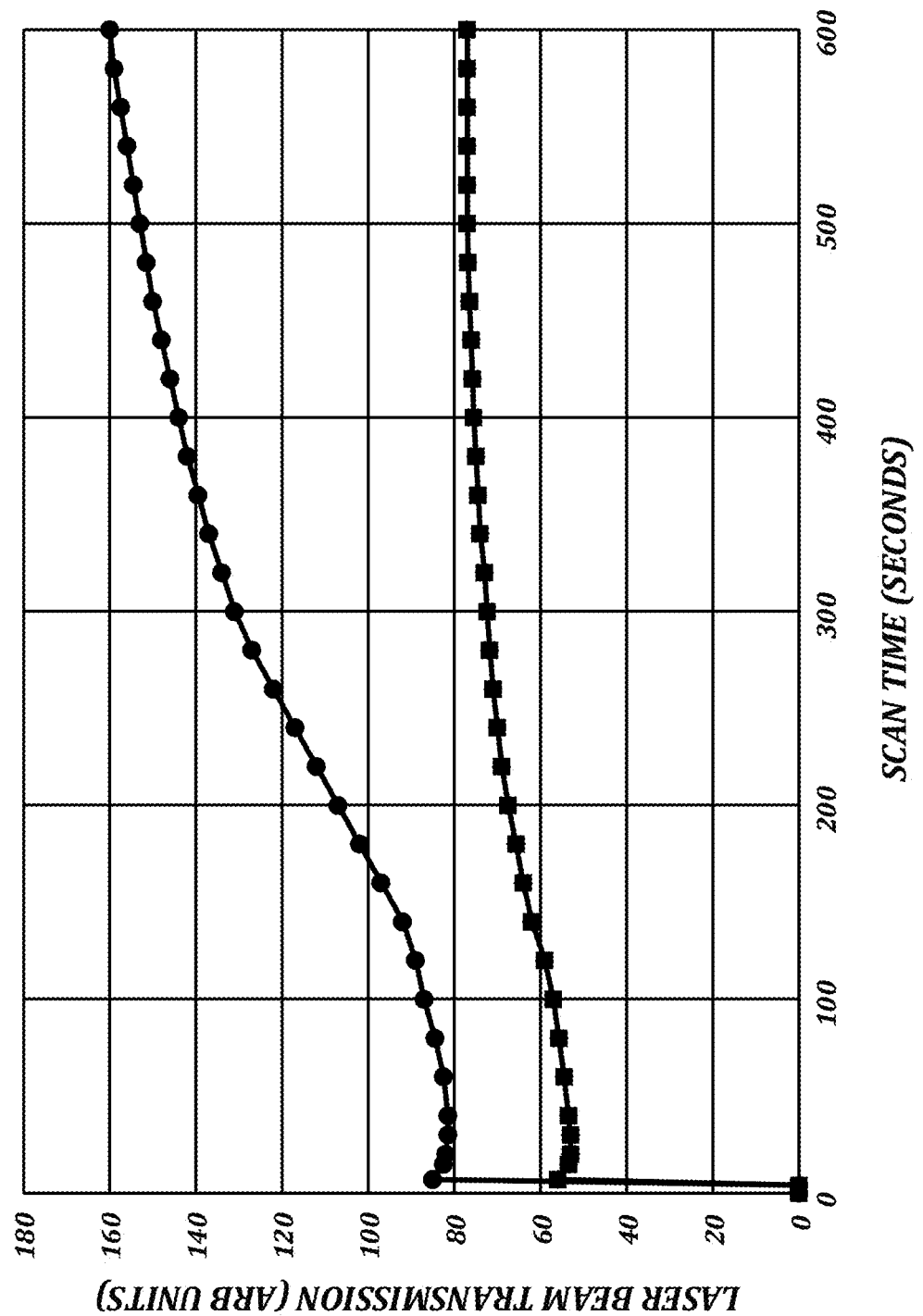
FIG. 11.

The results of a second set of temporal leaf transmission scans of laser light, for leaf #2, is displayed in FIG. 11. For the data of FIG. 11, the leaf treatments and scan procedures were identical to those for the data of FIG. 10. Henceforth, data for the distilled water treatment is referred to as "bare leaf data"; and, for leaf #2, data resulting from the $CaCO_3+$ $TiO_2$ nanoparticle solution treatment is referred to as "treated leaf data". Three differences in the data of FIG. 10 and FIG. 11 are noteworthy:

1. For the temporal leaf transmission scan for the bare leaf (FIG. 11), the scan extended to 600 sec., 200 sec. longer than the same scan for leaf #1.

2. For the data of FIG. 11, all values of leaf transmission are much larger than for the data of FIG. 10. This difference is due to the fact that Leaf #2 is much thinner than Leaf #1.

3. An upper limit of transmission value can be determined for both data sets of FIG. 11. The chloroplast movement inhibition factor (CPMIF) for these two data sets is obtained by subtracting, for each data set, the value of transmission at the transmission minimum occurring in the 25-50 sec. range of scan time from the ultimate maximum value of transmission. Then, CPMIF equals (bare leaf transmission difference)/(treated lea transmission difference) minus 1.

Data sets such as those exemplified in FIGS. 10 and 11 were obtained from 70 peppermint leaves, and the results of these measurements are summarized in Table 13.

TABLE 13

| Leaf Treatment | Chloroplast movement inhibition factor | Number of temporal scans |
| --- | --- | --- |
| CRC058 w/RDI-S (5%) + 300 ppm 5, 10, 20 nm $TiO_2$ | 9 | 1 |
| CRC058 w/3395 + 3395 (5%) w/150 ppm 10 nm $TiO_2$ | 2.5 | 1 |
| 11Hx w/lec. (3% sol'n) w/5% RDI-S | 1.6 | 4 |
| CRC058 w/3395 + 3395 (5%) | 1.4 | 2 |
| CRC90 w/RDI-S (5%) w/150 ppm 20 nm $TiO_2$ | 1.1 | 2 |
| CRC058 w/3395 + RDI-S (5%) + 150 ppm CCR200 (20 nm $TiO_2$) | 1 | 3 |
| CRC90 w/RDI-S (5%) w/150 ppm 20 nm $TiO_2$ DI-S + PCE | 0.5 | 2 |
| RDI-S + 20 nm $TiO_2$ (5%) | 0.5 | 2 |
| "J" $CaCO_3$ 11 HX | 0.5 | 1 |
| "g" RDI-S + PCE + 150 ppm 20 nm $TiO_2$ | 0.3 | 2 |
| 11Hx w/lec. (2% sol'n) | 0.3 | 1 |
| CRC058 + lec. (2%) | 0 | 3 |

Figure 12:
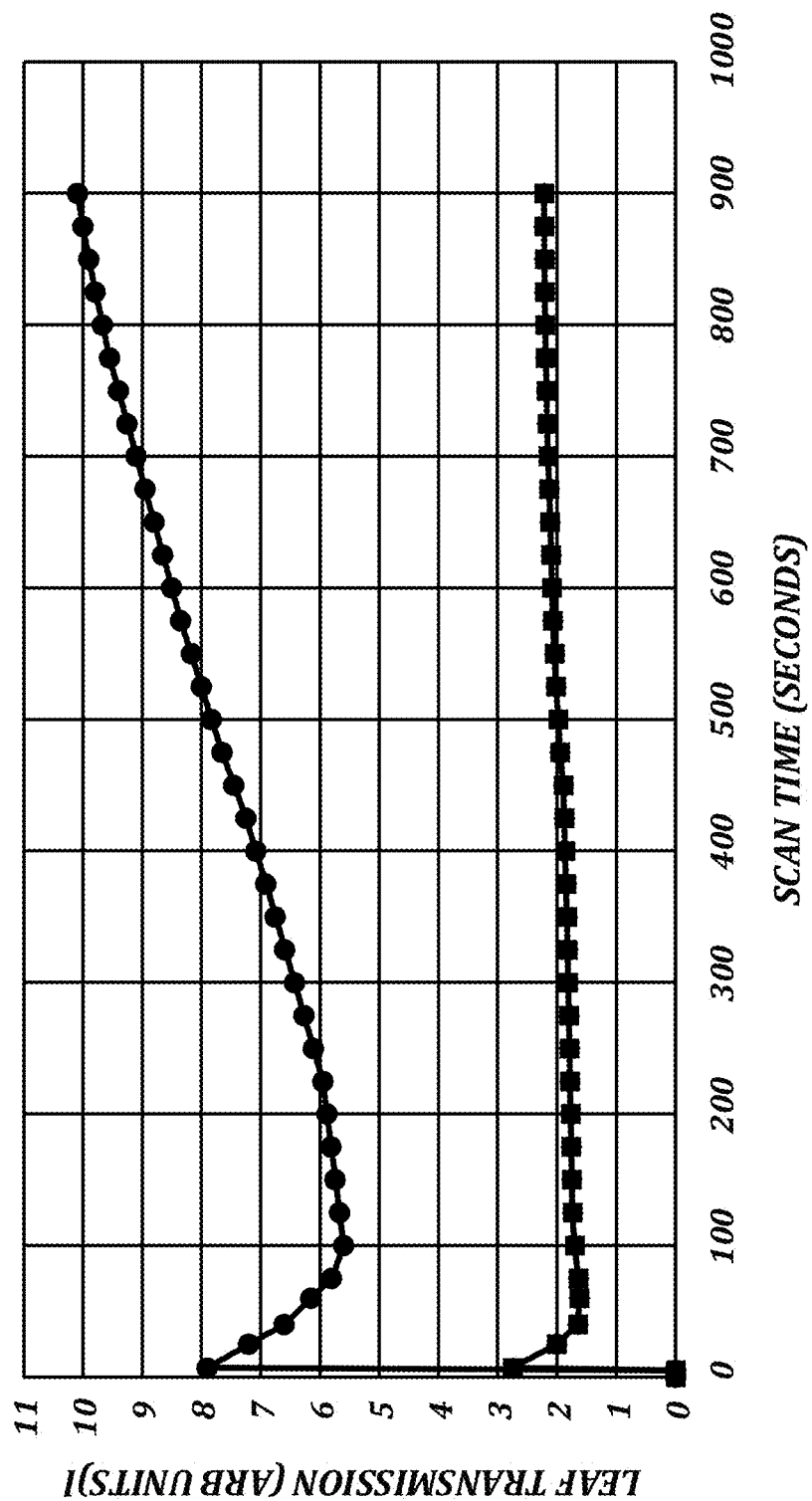
FIG. 12.

The CPMIF for the first entry in Table 13 is much larger that for any other leaf treatments. The data sets which yielded this large value of CPMIF are shown in FIG. 12. The overall low values of leaf transmission for the treated leaf data set of FIG. 12 is attributed to the relatively large quantity of $TiO_2$ nanoparticles in this leaf treatment. Thus, the laser light absorbed by $TiO_2$ nanoparticles is significantly larger than for any of the other leaf treatments listed in Table 13.

In conclusion for this Example, there is a slow-down in chloroplast strong light avoidance movement in $TiO_2$ nanoparticle-treated leaves. Without being bound by a specific mechanism, the data suggest that this slow-down is due to photocatalysis by $TiO_2$ inside the plant leaves. Although $TiO_2$ achieves an important effect, in practice, a mixed $TiO_2+CaCO_3$ solution will provide benefits from light scattering by the $CaCO_3$.

Figure 13:
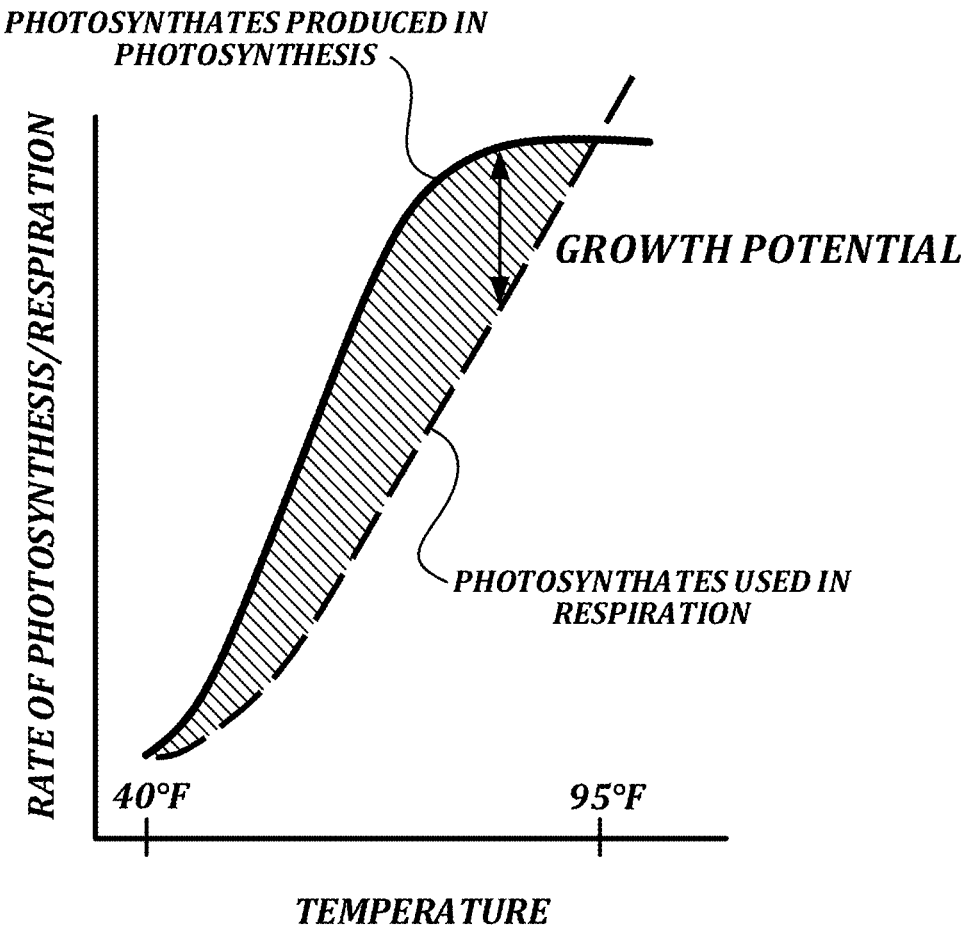
FIG. 13.

Example 6. Use of a $TiO_2$ Nanoparticle Foliar Treatment to Improve Water Use Efficiency in a Variety of Plants Species As described in this Example, data were collected over two growing seasons to investigate Water Use Efficiency (WUE) using a continuous method that does not involve the destruction of the crop. The method involves treatment of crops as described below, and measurement of relative humidity, air temperature, and crop temperature as measured using thermocouples. The data generated are indicative of water use and photosynthesis as shown in FIG. 13.

At an ambient temperature above 88° F., potential photosynthesis decreases by 50%. $CO_2$ fixation begins to be inhibited above 77 to 86° F. and rapidly falls off at temperatures in the 90's. Thus one goal of the Example is to demonstrate the feasibility of reduction of leaf temperature by the treatment of the disclosure, with corresponding preservation of photosynthetic rates as would be observed at lower temperatures.

The method also measures high potential photosynthesis, which occurs when the temperature is below 88° F. and vapor pressure deficit is below 30 hPa. Above these two parameters, the air has strong drying power, the stomata are closed down to a minimum to restrict water loss by transpiration, open only enough to prevent overheating, with little $CO_2$ assimilation occurring. Furthermore, respiration is rapidly increasing as the temperature increases, thus the maximum net potential photosynthesis occurs below these two parameters and the growth potential can be visualized as shown in FIG. 13, in the shaded area between the upper and lower curves.

Seven crops were used to obtain data: Pecan, Apple, Walnut, Grape, Plum, Tomato and Peppers. Water use efficiency improvement correlates with a better quality and larger crop with less water use.

"Mask/Diffusion" refers to treatment with an organic liquid calcium having the formulation as shown in Table 14 below. This treatment is also referred to as "conventional formula" and was applied at 2% or 4% as indicated below for specific experiments and crops.

TABLE 14

| Raw Materials | Wt. % | Batch Wt. (Lbs) | Gal. |
| --- | --- | --- | --- |
| Potable Water | 31.567 | 5860.19 | 703.5 |
| Calcium Hypochlorite [65] 7581P100L OV + Dust (Black & Magenta) cartridge | 0.014 | 2.60 | |
| Lecithin (Ultralec P or Yelkinol P). | 2.850 | 529.08 | |
| Sodium Carbonate P100 (magenta) cartridge | 0.400 | 74.26 | |
| Imasco 11HX Calcium Carbonate P100(magenta) cartridge | 61.500 | 11417.04 | |
| Denatured Ethyl Alcohol | 2.560 | 475.25 | |
| Clove Oil | 0.166 | 30.82 | |
| Vanzan ® Xanthum Gum P100 (magenta) cartridge | 0.135 | 25.01 | |
| Vansil ® W-50 P100 (magenta) cartridge | 0.808 | 150.00 | |
| Total | 100.000 | 18564.30 | 1370.1 |

VANSIL® W-50 is a fine grind of wollastonite (calcium metasilicate) (Vanderbilt Minerals, LLC, Norwalk, Conn., USA)
VANZAN® is a Xanthum Gum (Vanderbilt Minerals, LLC, Norwalk, Conn., USA) Procedure for mixing for Table 14:
1. Load well water in High Shear Mixer. Begin agitation.
2. In mixer, load Calcium Hypochlorite, mix to dissolve.
3. In mixer, load Lecithin (Ultralec P or Yelkinol P), mix to disperse. Mix 10 minutes.
4. In Mixer, load Sodium Carbonate, mix to dissolve. Mix 5 minutes.
5. In Mixer, load Imasco 11 HX Calcium Carbonate while mixing.
6. In Mixer, load Denatured Ethyl Alcohol, mix to disperse.
7. In Mixer, load Clove Oil. Mix 10 minutes.
8. In shaker hopper, load Vanzan®, turn on shaker, sift into mixer to disperse. After sifting is complete, continue mixing 30 minutes.
9. In Mixer, load Vansil® W-50, mix to disperse. Continue to mix final batch 1 hour.
10. From Mixer, measure pH. The pH should be in the range 10.0-10.8.

Pecans. Pecans have large leaves and these were grown without irrigation. A 2% conventional formula application was used. June morning temperatures when the experiment was performed were in the 70's, reaching the 90's before 10 a.m., which particularly accentuated the high potential photosynthesis as it was only in this range for a short time each day. The results were as follows for pecans:
10-15% less transpiration on average
5-10% less water
5-30% less time over 88° F.
5-40% more potential photosynthesis
50-75% more high potential photosynthesis Apples. The daytime temperatures were in the 70's and 80's. A 4% solution of Mask/Diffusion formulation was used, with one spray application. There was no irrigation. The results were as follows:
5-10% less transpiration on average
5-10% less water
5-30% less time over 88° F.
5-10% more potential photosynthesis
15-45% more high potential photosynthesis Three additional crops were tested: irrigated grapes, irrigated walnut, and plum. The thermocouples were installed, the RH recorders were installed, and the crops were sprayed with a 2% Mask/Diffusion solution just prior to a major temperature increase to the upper 90's, with the daytime humidity dropping below 20%. The experiment was run for six weeks into late August.

The results with grapes were as follows:
5-15% less transpiration on average
5% less water
20-40% less time over 88° F.
25-30% more potential photosynthesis
25-30% more high potential photosynthesis Walnuts. The mature walnuts leaves held the thermocouples securely for the six weeks. After six weeks with one application of 2% Mask/Diffusion solution, the trees had no evidence of sunburn, and the leaves were still covered with the treatment.

Results for walnut were as follows:
5-15% less transpiration on average
5-10% less water
15-30% less time over 88° F.
20-40% more potential photosynthesis
15-40% more high potential photosynthesis Plum. In the non-irrigated plum tree, the thermocouples remained the full time of the experiment, but they had to be installed at the leaf stem junction instead of in the leaf itself as they are smaller leaves. The results with plum were as follows:
10% less transpiration on average
5% less water
5-40% less time over 88° F.
15-55% more potential photosynthesis
25-30% more high potential photosynthesis Peppers and tomatoes were tested during a phase of mostly clear, windy and 90 degree days. Plants were treated with a 2% solution. Data collection was performed and yielded the following results for tomatoes and peppers combined:

5% less transpiration on average
5% less water
10-30% less time over 88° F.
5-15% more potential photosynthesis
10-30% more high potential photosynthesis In conclusion for Example 6, these proof-of-principle experiments with five tree species and two vegetable species provide evidence that treating plant leaves with a composition as described in Table 11 reduced leaf temperature and reduced water use. This information taken together with the full disclosure validates the use of the $CaCO_3+TiO_2$ treatments of the invention as a new method of slowing down strong light avoidance movement of chloroplasts while at the same time providing protection of the plant from the sun and heat. With such treatment, the plants can better retain their ability to capture $CO_2$ and continue photosynthesis.

As will be understood by one of ordinary skill in the art, each embodiment disclosed herein can comprise, consist essentially of, or consist of its particular stated element, step, ingredient or component. Thus, the terms "include" or "including" should be interpreted to recite: "comprise, consist of, or consist essentially of." The transition term "comprise" or "comprises" means includes and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment. A material effect would cause a statistically-significant reduction in a claimed composition or method's effectiveness in accomplishing the intended effect of the composition or method.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the", and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. It is anticipated that one or more members of a group can be included in, or deleted from, a group for reasons of convenience and/or patentability. When any such inclusion or deletion occurs, the specification is deemed to contain the group as modified thus fulfilling the written description of all Markush groups used in the appended claims.

Particular embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, references have been made to patents, printed publications, journal articles and other written text throughout this specification (referenced materials herein). Each of the referenced materials is individually incorporated herein by reference in their entirety for their referenced teaching.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention can be embodied in practice.

Definitions and explanations used in the present disclosure are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary, 3rd Edition or a dictionary known to those of ordinary skill in the art, such as the Oxford Dictionary of Biochemistry and Molecular Biology (Ed. Anthony Smith, Oxford University Press, Oxford, 2004).

In closing, it is to be understood that the embodiments of the invention disclosed herein are illustrative of the principles of the present invention. Other modifications that can be employed are within the scope of the invention. Thus, by way of example alternative configurations of the present invention can be utilized in accordance with the teachings herein. Accordingly, the present invention is not limited to that precisely as shown and described.

The invention claimed is:

1. A method for improving water use efficiency in a plant, said method comprising applying a composition to a plant leaf in an amount effective to decrease water use, wherein said composition comprises nanoparticles of titanium dioxide, nanoparticles of calcium carbonate, at least one surfactant, and water in an amount adequate to provide flowability, wherein the titanium dioxide ranges in size from about 10 nm to about 50 nm and is used at a concentration of about 50 ppm to about 500 ppm.

2. The method of claim 1, wherein said calcium carbonate nanoparticles range in size from about 200 nm to about 3 microns.

3. The method of claim 1, wherein said surfactant is selected from the group consisting of lecithin, ether carboxylate, alkyl ethoxylate, and silicone.

4. The method of claim 1, wherein said composition comprises, in percent weight: potable water (32.7%); calcium hypochlorite (0.02%); polycarboxylate ether (0.50%); alcohol C12-16 poly(1-6)ethoxylate (1.00%); calcium acetate (3.00%); ultrafine rutile titanium dioxide (4.00%); calcium metasilicate (3.50%); calcium carbonate about 200 nm to about 3 microns in diameter (54.5%); acrylic polymer (0.22%); clove oil (0.04%); polydimethylsiloxane fluid (0.27%); benzisothiazol-3(2h)-one (0.15%); and 4,4-dimethyloxazolidine (0.10%).

5. The method of claim 1, wherein said composition comprises, in percent weight: potable water, 14.44 w/w %; alcohol C12-16 poly(1-6)ethoxylate, 1.00 w/w %; titanium dioxide, 5.00 w/w %; calcium carbonate calcite wet ground formulation at 74% calcium carbonate, 78.96 w/w %; polydimethylsiloxane fluid, 0.25 w/w %; benzisothiazol-3(2h)-one, 0.15 w/w %; 4,4-dimethyloxazolidine, 0.10 w/w %; and guar gum, 0.10 w/w %.

6. The method of claim 1, wherein said composition comprises, in percent weight: potable water, 30.08%; polycarboxylate ether, 0.95%; soy lecithin, 2.71%; sodium carbonate, 0.38%, calcium carbonate calcite dry ground formulation, 58.43%; alcohol, 2.14% (ethanol or isopropanol); clove oil, 0.19%; guar gum, 0.12%; and titanium dioxide, 5.00%.

7. The method of claim 1, wherein said water use is reduced by at least 5% to 10% compared to water use in an untreated control plant.

8. The method of claim 1, wherein said leaf is a fruit tree leaf, a nut tree leaf, a vine leaf, a vegetable crop leaf, a fruit crop leaf, a deciduous leaf, an evergreen ornamental leaf, or forest tree leaf.

9. The method of claim 8, wherein said leaf is a plant leaf of a plant selected from the group consisting of pecan, apple, walnut, grape, plum, tomato, and pepper.

10. A method for improving water use efficiency in a plant, said method comprising applying a composition to a plant leaf in an amount effective to decrease water use, wherein said composition comprises nanoparticles of titanium dioxide, nanoparticles of calcium carbonate, at least one surfactant, and water in an amount adequate to provide flowability, wherein the titanium dioxide ranges in size from about 200 nm to about 250 nm and is used at a concentration of about 1% to about 5% by weight based on the total weight of the composition.

11. A method for improving water use efficiency in a plant, said method comprising applying a composition to a plant leaf in an amount effective to decrease water use, wherein said composition comprises nanoparticles of titanium dioxide, nanoparticles of calcium carbonate, at least one surfactant, and water in an amount adequate to provide flowability, wherein said composition comprises, in percent weight: potable water (32.7%); calcium hypochlorite (0.02%); polycarboxylate ether (0.50%); alcohol C12-16 poly(1-6)ethoxylate (1.00%); calcium acetate (3.00%); ultrafine rutile titanium dioxide (4.00%); calcium metasilicate (3.50%); calcium carbonate about 200 nm to about 3 microns in diameter (54.5%); acrylic polymer (0.22%); clove oil (0.04%); polydimethylsiloxane fluid (0.27%); benzisothiazol-3(2h)-one (0.15%); and 4,4-dimethyloxazolidine (0.10%), or wherein said composition comprises, in percent weight: potable water, 14.44 w/w %; alcohol C12-16 poly(1-6)ethoxylate, 1.00 w/w %; titanium dioxide, 5.00 w/w %; calcium carbonate calcite wet ground formulation at 74% calcium carbonate, 78.96 w/w %; polydimethylsiloxane fluid, 0.25 w/w %; benzisothiazol-3(2h)-one, 0.15 w/w %; 4,4-dimethyloxazolidine, 0.10 w/w %; and guar gum, 0.10 w/w %; or wherein said composition comprises, in percent weight: potable water, 30.08%; polycarboxylate ether, 0.95%; soy lecithin, 2.71%; sodium carbonate, 0.38%, calcium carbonate calcite dry ground formulation, 58.43%; alcohol, 2.14% (ethanol or isopropanol); clove oil, 0.19%; guar gum, 0.12%; and titanium dioxide, 5.00%.

* * * * *